(12) United States Patent  
Waddell et al.

(10) Patent No.: US 11,747,201 B2
(45) Date of Patent: *Sep. 5, 2023

(54) INFRARED SPECTROPHOTOMETER

(71) Applicant: UNIVERSITY OF THE WEST OF SCOTLAND, Paisley (GB)

(72) Inventors: Ewan Waddell, Fintry (GB); Desmond Gibson, Helensburgh (GB)

(*) Notice: Subject to any disclaimer, the term of this patent is extended or adjusted under 35 U.S.C. 154(b) by 40 days.

This patent is subject to a terminal disclaimer.

(21) Appl. No.: 17/375,897

(22) Filed: Jul. 14, 2021

(65) Prior Publication Data

US 2021/0341335 A1 Nov. 4, 2021

Related U.S. Application Data

(63) Continuation of application No. 16/485,870, filed as application No. PCT/GB2018/050391 on Feb. 13, 2018, now Pat. No. 11,092,488.

(30) Foreign Application Priority Data

Feb. 15, 2017 (GB) ...................................... 1702480

(51) Int. Cl.
*G01J 3/10* (2006.01)
*G01J 3/02* (2006.01)
(Continued)

(52) U.S. Cl.
CPC ............. *G01J 3/108* (2013.01); *G01J 3/0208* (2013.01); *G01J 3/12* (2013.01); *G01J 3/42* (2013.01);
(Continued)

(58) Field of Classification Search
CPC .. G01J 3/108; G01J 3/0208; G01J 3/12; G01J 3/42; G01J 2003/1226; G01N 21/3504;
(Continued)

(56) References Cited

U.S. PATENT DOCUMENTS 4,180,734 A 12/1979 Gedeon
4,227,948 A 10/1980 Jensen et al.
(Continued)

FOREIGN PATENT DOCUMENTS

CN 1304857 C 3/2007
CN 101182132 A 5/2008
(Continued)

OTHER PUBLICATIONS

Li, Cheng et al. (2017) Modeling and validation of uniform large-area optical coating deposition on a rotating drum using microwave plasma reactive sputtering.
(Continued)

*Primary Examiner* — Marcus H Taningco
(74) *Attorney, Agent, or Firm* — Snell & Wilmer L.L.P.; Howard I. Sobelman

(57) ABSTRACT

An optical sensor for multispectral analysis of a fluid sample comprises at least one light source, at least one interference filter, and a plurality of light detectors arranged such that light emitted by the at least one light source is incident on the at least one interference filter. There is a spatial variation in the intensity of light incident on the said at least one interference filter.

20 Claims, 9 Drawing Sheets

(51) Int. Cl.
- *G01J 3/12* (2006.01)
- *G01J 3/42* (2006.01)
- G01N 21/3504 (2014.01)
- G01N 21/3577 (2014.01)

(52) U.S. Cl.
CPC .. *G01J 2003/1226* (2013.01); *G01N 21/3504* (2013.01); *G01N 21/3577* (2013.01)

(58) Field of Classification Search
CPC ... G01N 21/3577; G01N 21/27; G01N 21/359
See application file for complete search history.

(56) References Cited

U.S. PATENT DOCUMENTS

| | | | |
|---|---|---|---|
| 4,704,339 | A | 11/1987 | Green et al. |
| 4,735,699 | A | 4/1988 | Wort et al. |
| 4,740,442 | A | 4/1988 | Waddell et al. |
| 4,870,027 | A | 9/1989 | Chu et al. |
| 5,731,583 | A | 3/1998 | Bailey et al. |
| 5,793,043 | A | 8/1998 | Weckstrom et al. |
| 5,818,049 | A | 10/1998 | Bailey et al. |
| 5,872,655 | A | 2/1999 | Seddon et al. |
| 11,092,488 | B2 * | 8/2021 | Waddell ............ G01J 3/42 |
| 2002/0131044 | A1 | 9/2002 | Kobayashi et al. |
| 2002/0191175 | A1 | 12/2002 | Coombs et al. |
| 2003/0038938 | A1 | 2/2003 | Jung et al. |
| 2003/0076499 | A1 | 4/2003 | Yamada et al. |
| 2004/0043218 | A1 | 3/2004 | Johnson et al. |
| 2004/0162470 | A1 | 8/2004 | Tu |
| 2005/0129577 | A1 | 6/2005 | Potapov et al. |
| 2006/0216470 | A1 | 9/2006 | Johnson et al. |
| 2006/0249815 | A1 | 11/2006 | Forbes et al. |
| 2007/0148760 | A1 | 6/2007 | Kiesel et al. |
| 2007/0275563 | A1 | 11/2007 | Babich et al. |
| 2008/0187011 | A1 | 8/2008 | Kiesel et al. |
| 2008/0224046 | A1 | 9/2008 | Ogando et al. |
| 2009/0017230 | A1 | 1/2009 | Tudhope et al. |
| 2009/0242771 | A1 | 10/2009 | Hartley |
| 2010/0043706 | A1 | 2/2010 | Jung et al. |
| 2010/0092083 | A1 | 4/2010 | Herloski et al. |
| 2010/0148083 | A1 | 6/2010 | Brown et al. |
| 2011/0089316 | A1 | 4/2011 | Hosier et al. |
| 2015/0109663 | A1 | 4/2015 | Gittler et al. |
| 2015/0377774 | A1 | 12/2015 | Saptari |
| 2017/0059476 | A1 | 3/2017 | Sethumadhavan et al. |

FOREIGN PATENT DOCUMENTS

| | | |
|---|---|---|
| CN | 101414017 A | 4/2009 |
| CN | 101464530 A | 6/2009 |
| CN | 104480436 A | 4/2015 |
| DE | 102007057753 A1 | 6/2009 |
| EP | 1061355 A1 | 12/2000 |
| EP | 2169384 A1 | 3/2010 |
| RU | 2357321 C1 | 5/2009 |
| WO | 0169213 A3 | 9/2001 |
| WO | 02082990 A1 | 10/2002 |
| WO | 2004106889 A3 | 12/2004 |
| WO | 2013167874 A1 | 11/2013 |

OTHER PUBLICATIONS

Shigeng Song et al. (2017) "Reactive dynamics analysis of critical Nb2O5 sputtering rate for drum-based metal-like deposition," Appl. Opt. 56, C206-C210.

Gamarts, AE et al. (2006). Photoluminescence in the Pb1 -xCdxSe Polycrystalline Layers Activated in the Presence of Iodine Vapor. Semiconductors.

Irnis Kubat et al. (2014) "Mid-infrared supercontinuum generation to 12.5μm in large NA chalcogenide step-index fibres pumped at 4.5μm," Opt. Express 22, 19169-19182.

GB Search Report under Section 17, for Application No. GB1702480.3, dated Apr. 4, 2017.

PCT International Search Report & Written Opinion, for Application No. PCT/GB2018/050391, dated Aug. 30, 2018.

* cited by examiner

INFRARED SPECTROPHOTOMETER

CROSS-REFERENCE TO RELATED APPLICATION

This application is a continuation of U.S. application Ser. No. 16/485,870, entitled, "INFRARED SPECTROPHOTOMETER," filed on Aug. 14, 2019, which is a 371 application of PCT Application No. PCT/GB2018/050391, entitled, "INFRARED SPECTROPHOTOMETER," filed on Feb. 13, 2018, which claims priority to United Kingdom Application No. 1702480.3, entitled, "INFRARED SPECTROPHOTOMETER," filed Feb. 15, 2017. The contents of the above-noted applications are incorporated by reference herein as if set forth in full and priority to this application is claimed to the full extent allowable under U.S. law and regulations.

FIELD OF THE INVENTION

The invention relates to optical sensors and methods for detecting one or more species in a fluid sample, and methods for calibrating optical sensors.

BACKGROUND TO THE INVENTION

The detection of species (such as atoms, molecules, molecular fragments or ions) in fluid samples (such as gas or liquid samples) is necessary in many fields of technology, including industrial safety monitoring, medicine, food processing and environmental monitoring. Sensors currently used include electrochemical sensors, catalytic sensors, photoionisation sensors and spectroscopic sensors.

Infrared (IR) spectroscopic techniques generally involve illuminating a gas or liquid sample with infrared light in order to excite atomic and/or molecular vibrations and studying the resulting spectrum of light absorbed by or transmitted through the sample in order to identify the vibrations. IR spectroscopic techniques can be sensitive and accurate, but current IR systems are often expensive and relatively large, and can consume a lot of power, limiting uptake in commercial and consumer applications.

Non-dispersive infrared (NDIR) sensors, in which the intensity of light absorption is measured at a particular wavelength (typically selected using a bandpass filter), are well-known for use in measuring concentrations of individual gases. Individual NDIR sensors are not generally suitable for detecting two or more species simultaneously; multiple NDIR sensors are required for such purposes.

Accordingly, there is a need for smaller and less expensive IR-based sensing devices (particularly those which may be portable) capable of detecting more than one species, for use in commercial and/or consumer applications, without a reduction in accuracy. There is also a need for autonomous IR-based sensing devices which consume less power.

SUMMARY OF THE INVENTION

A first aspect of the invention provides an optical sensor for multispectral analysis of a fluid sample. The sensor comprises at least one light source, at least one interference filter, and a plurality of light detectors. The at least one light source, the at least one interference filter and the plurality of light detectors are arranged such that (i.e. in use) light emitted by the at least one light source is incident on the at least one interference filter. There is a spatial variation in the intensity of light from the at least one light source incident on the at least one interference filter.

By multispectral analysis of a fluid sample we mean the detection and analysis of a plurality of different absorption spectra (i.e. across a plurality of different wavelength bands) from a fluid sample in order to determine the presence (and/or concentration) of a plurality of species (e.g. atoms, molecules, molecular fragments and/or ions) in the fluid sample associated with the particular spectra. Multispectral analysis permits the detection of more than one species in the fluid sample (i.e. at the same time) through one set of measurements.

It may be that the optical sensor is an optical sensor for multispectral analysis of a gas sample (i.e. an optical gas sensor). Additionally or alternatively, it may be that the optical sensor is an optical sensor for multispectral analysis of a liquid sample.

There is typically a spatial variation in the intensity of light incident on the at least one interference filter when there is no fluid sample present (i.e. when there is no analyte present). There is typically also a spatial variation in the intensity of light incident on the at least one interference filter when there is fluid sample present (i.e. when there is analyte present). It may be that the spatial variation in the intensity of light incident on the at least one interference filter when no fluid sample is present is the same (or at least similar to) the spatial variation in the intensity of light incident on the at least one interference filter when there is fluid sample present.

The at least one light source, the at least one interference filter and the plurality of light detectors may be arranged such that (i.e. in use) light emitted by the at least one light source passes through the fluid sample and is incident on the at least one interference filter. It may be that the sensor comprises a chamber (i.e. a sample chamber) and that the at least one light source, the at least one interference filter and the plurality of light detectors are arranged such that (i.e. in use) light emitted by the at least one light source passes through the chamber (i.e. through the sample chamber, for example through the fluid sample within the said chamber) and is incident on the at least one interference filter. It may be that the optical sensor comprises a sensor body having at least one wall defining the said chamber and at least one aperture in said wall through which the fluid sample can enter the chamber.

The at least one light source, the at least one interference filter and the plurality of light detectors may be arranged such that light emitted by the at least one light source and transmitted through the at least one interference filter is incident on (i.e. is received by) the plurality of light detectors. Additionally or alternatively, it may be that the at least one light source, the at least one interference filter and the plurality of light detectors are arranged such that light emitted by the at least one light source and reflected by the at least one interference filter is incident on (i.e. is received by) the plurality of light detectors.

It may be that the plurality of light detectors is configured to output one or more signals (e.g. one or more electronic signals) on detection of light transmitted through the at least one interference filter. Additionally or alternatively, it may be that the plurality of light detectors is configured to output one or more signals (e.g. one or more electronic signals) on detection of light reflected by the at least one interference filter.

It may be that the sensor is configured to (e.g. programmed to) compensate the one or more signals output by the plurality of light detectors for the spatial variation in the intensity of light incident on the at least one interference filter. For example, the sensor may be configured to (e.g. programmed to) scale the one or more signals output by the plurality of light detectors.

The sensor is typically configured to (e.g. programmed to) calculate one or more outputs, such as the detected concentration of one or more analytes. The sensor is typically configured to (e.g. programmed to) calculate the one or more outputs based on the one or more signals output by the plurality of light detectors. The sensor may be configured to (e.g. programmed to) process the one or more signals output by the plurality of light detectors to calculate the one or more outputs. Typically, the sensor takes into account stored calibration data when calculating the one or more outputs.

It may be that the sensor is configured to (e.g. programmed to) calculate the one or more outputs (i.e. based on the one or more signals output by the plurality of light detectors) while compensating for the spatial variation in the intensity of light incident on the at least one interference filter. The sensor may be configured to (e.g. programmed to) process the one or more signals output by the plurality of light detectors to calculate the one or more outputs while compensating for the spatial variation in the intensity of light incident on the at least one interference filter.

It may be that the plurality of light detectors is configured to output one or more signals indicative of the intensity of light incident on (i.e. received by) the plurality of light detectors at one or more (i.e. characteristic) wavelengths and the sensor is configured to (e.g. programmed to) calculate the one or more outputs based on the one or more signals while compensating for the spatial variation in the intensity of light incident on the at least one interference filter (e.g. to process the one or more signals to calculate the one or more outputs while compensating for the spatial variation in the intensity of light incident on the at least one interference filter).

It may be that the plurality of light detectors is configured to output one or more signals indicative of the intensity of light incident on (i.e. received by) the plurality of light detectors within one or more (i.e. characteristic) wavelength ranges and the sensor is configured to (e.g. programmed to) calculate the one or more outputs based on the one or more signals while compensating for the spatial variation in the intensity of light incident on the at least one interference filter (e.g. to process the one or more signals to calculate the one or more outputs while compensating for the spatial variation in the intensity of light incident on the at least one interference filter).

It may be that the sensor is configured to (e.g. programmed to) to determine a spectral (i.e. wavelength-dependent) variation in the intensity of light incident on the at least one interference filter (i.e. the variation of the intensity of light incident on the at least one interference filter as a function of wavelength) based on the one or more signals output by the plurality of light detectors.

In use, the sensor typically detects light which is transmitted through the at least one interference filter and/or light which is reflected by the at least one interference filter. Assuming that both absorption and scattering of incident light by the at least one interference filter are negligible, the intensity of light received by the plurality of light detectors is dependent on both the spatial and spectral variations in the intensity of light incident on the at least one interference filter, as well as the spectral variation in the light transmitted and/or reflected by the at least one interference filter. By compensating measurements of the reflected and/or transmitted light intensity for the spatial variation in the intensity of light incident on the at least one interference filter, the spectral variation of the light intensity can be isolated, resulting in a more accurate measurement of the absorption spectra at each detector location. The sensor can therefore correct for the non-uniformity of illumination across the at least one interference filter (and therefore across the plurality of light detectors).

It may be that the optical sensor comprises a processor (e.g. in electronic communication with a memory storing computer executable program code) configured to (e.g. programmed to) process the one or more signals output by the plurality of light detectors to calculate one or more outputs (for example the detected concentration of one or more analytes) while compensating for the spatial variation in the intensity of light incident on the at least one interference filter.

It may be that the processor is configured to (e.g. programmed to) process the one or more signals output by the plurality of light detectors to calculate the one or more outputs taking into account (i.e. using) spatial variation calibration data.

It may be that the memory stores the spatial variation calibration data. The spatial variation calibration data may be stored in the form of a look-up table.

The spatial variation calibration data may be data describing the spatial variation in the intensity of light incident on the at least one interference filter. The spatial variation calibration data may specify, for example, the intensity (e.g. relative intensity) of light detected at one or more different positions (i.e. along the at least one interference filter). The spatial variation calibration data may specify, for example, the intensity (e.g. relative intensity) of light detected at two or more different positions (i.e. along the at least one interference filter). The spatial variation calibration data may specify the intensity (e.g. relative intensity) of light detected at one or more of the plurality of light detectors. The spatial variation calibration data may specify the intensity (e.g. relative intensity) of light detected at two or more of the plurality of light detectors. The spatial variation calibration data may specify the intensity (e.g. relative intensity) of light detected at one or more of the plurality of light detectors. The spatial variation calibration data may specify the intensity (e.g. relative intensity) of light detected at two or more of the plurality of light detectors. The spatial variation calibration data may specify the intensity (e.g. relative intensity) of light detected at one or more (or two or more) different positions (i.e. along the at least one interference filter) and/or one or more (or two or more) of the plurality of light detectors with reference to one or more reference measurements (for example one or more temperature measurements and/or one or more fluid composition (e.g. analyte concentration) measurements).

It may be that the processor is configured to (e.g. programmed to) process the one or more signals output by the plurality of light detectors to calculate the one or more outputs taking into account (i.e. using) the spatial variation calibration data to thereby determine the spectral variation in the intensity of light incident on the at least one interference filter.

It may be that the processor is configured to (e.g. programmed to) process the one or more signals output by the plurality of light detectors to calculate the one or more outputs taking into account (i.e. using) one or more (e.g. two or more) reference measurements (for example temperature measurements and/or fluid composition (e.g. analyte concentration) measurements).

It may be that the optical sensor comprises a processing circuit configured to process the one or more signals output by the plurality of light detectors to provide one or more outputs taking into account (e.g. while compensating for) the spatial variation in the intensity of light incident on the at least one interference filter. It may be that the processing circuit is configured to process the one or more signals output by the plurality of light detectors to thereby determine the spectral variation in the intensity of light incident on the at least one interference filter.

It may be that the sensor comprises a plurality of first light detectors and a plurality of second light detectors, the plurality of first light detectors receiving (i.e. in use) light transmitted through the at least one interference filter and the plurality of second light detectors receiving (i.e. in use) light reflected by the at least one interference filter. The plurality of first light detectors is typically configured (e.g. arranged) to receive the light transmitted through the at least one interference filter. The plurality of second light detectors is typically configured (e.g. arranged) to receive the light reflected by the at least one interference filter.

In embodiments comprising the plurality of first light detectors and the plurality of second light detectors, the sensor typically detects both light which is transmitted through the at least one interference filter and light which is reflected by the at least one interference filter. Assuming that both absorption and scattering of incident light by the at least one interference filter is negligible, light signals detected by the plurality of first light detectors and light signals detected by the plurality of second light detectors may be combined to reconstruct the total light intensity incident on the at least one interference filter. The inventors have found that this combined signal from the plurality of first light detectors and the plurality of second light detectors exhibits a spatial variation (i.e. a variation in intensity with detector position) which is the same as (or proportional to) the spatial variation in the intensity of light incident on the at least one interference filter. In contrast, the individual signals from the plurality of first light detectors and the plurality of second light detectors depend on both the spectral variation in the light transmitted through and/or reflected by the at least one interference filter and the spatial variation in the intensity of light incident on the at least one interference filter. Measurement of the combined signal may therefore be used to correct for the effect of the spatial variation in light intensity on the individual signals output by the plurality of first light detectors and the plurality of second light detectors, resulting in a more accurate measurement of the absorption spectra at each detector location. The sensor can therefore correct for the non-uniformity of illumination across the at least one interference filter (and therefore across the plurality of first light detectors and the plurality of second light detectors).

The inventors have also found that spectral variations in the light signal caused by spectral variation at the at least one light source and/or the detectors may be compensated for by determining the light intensity for one or more reference wavelengths at which absorption of light is expected to be essentially independent of the fluid contents (e.g. the species present in the fluid sample). For example, temperature-dependent spectral variations in the light signal due to temperature-dependent spectral variations in the at least one light source and/or the detectors may be achieved in this way. The light intensity may be measured for several such reference wavelength ranges (for example, three or more wavelength ranges). The light intensity measured at the one or more reference wavelengths may be compared to temperature calibration data. The temperature calibration data may be stored in a look-up table.

The temperature calibration data may be generated by measuring the light intensity detected over a range of wavelengths at two or more different temperatures. The temperature calibration data may also be generated by measuring the light intensity detected over a range of wavelengths at two or more different temperatures using fluid samples having different compositions (for example different analyte concentrations), for example two or more different compositions. Assuming that the at least one light source functions as a blackbody light source, the spectral variation in light emitted by the at least one light source can be determined using Planck's law. The spectral variation in the detectivity of the detectors can be determined as a function of the structural and material characteristics of the said detectors (for example the detector bandgaps). The temperature of the at least one light source, the temperature of the detectors and the throughput of any optics provided therebetween constitute three independent parameters which can be determined by measuring detector signals at three or more different wavelengths (or in three or more different wavelength bands). The detector signals measured at the three or more different wavelengths (or in three or more different wavelength bands) may be compared to the temperature calibration data. The detector signals measured at the three or more wavelengths (or in three or more wavelength bands) may used to parametrise (e.g. fit, for example by way of a least squares method) a mathematical function describing the temperature-dependent spectral variation of the sensor as a whole (the functional form having been determined empirically or, as explained above, theoretically based on Planck's law for blackbody radiation and the known temperature-dependence of the detectivity of the detectors).

It will be understood that the term "light" is used to refer to electromagnetic radiation in general and is not restricted to radiation in the visible spectrum.

It may be that the light is infrared light (i.e. having wavelengths in the range 700 nm to 1,000,000 nm). It may be that the at least one light source is at least one infrared light source. It may be that the at least one interference filter is at least one infrared interference filter. It may be that the plurality of first light detectors is a plurality of first infrared light detectors. It may be that the plurality of second light detectors is a plurality of second infrared light detectors.

It may be that the at least one light source is configured to emit infrared light having wavelengths in the range 2000 nm to 14000 nm, or 2000 nm to 5000 nm.

It may be that the at least one light source is at least one near-infrared (NIR) light source, that is to say a light source configured to emit light having wavelengths in the range 700 nm to 2500 nm. Additionally or alternatively, it may be that the at least one light source is at least one mid-infrared (mid-IR) light source, that is to say a light source configured to emit light having wavelengths in the range 2500 nm to 10000 nm.

The at least one light source is typically at least one broadband light source, that is to say the at least one light source is typically configured to emit light (e.g. substantially uniformly) over a range of frequencies (i.e. the light source is not a monochromatic light source).

It may be that the at least one light source is configured to emit a (e.g. substantially) spatially uniform beam of light. It may be that the at least one light source is configured to emit a beam of light which varies spatially.

The at least one light source may comprise a plurality of (i.e. distinct) light-emitting regions.

It may be that the sensor comprises a collector configured to collect light emitted by the at least one light source. The collector may be configured to collimate the light emitted by the at least one light source. The collector may be configured to condense the light emitted by the at least one light source into a beam of light. The beam of light may be a substantially parallel beam of light. The beam of light may be a slightly divergent beam of light, i.e. in which individual light rays diverge by up to 6°.

It may be that the at least one light source consists of one light source (i.e. a single light source). It may be that the said light source is (i.e. substantially) elongate. It may be that the said light source comprises (e.g. consists of) a (i.e. substantially) elongate light-emitting region.

It may be that the at least one light source consists of a plurality of light sources. It may be that each of the plurality of light source is (i.e. substantially) elongate. It may be that the plurality of light sources are arranged to form a (i.e. substantially) elongate light-emitting region.

It may be that the at least one light source consists of an array of light sources. It may be that the array of light sources is (i.e. substantially) elongate. It may be that the array of light sources forms a (i.e. substantially) elongate light-emitting region.

It is more efficient to use elongate (i.e. substantially elongate) light sources or light-emitting regions in embodiments in which the plurality of first light detectors is (i.e. substantially) elongate (e.g. the plurality of first light detectors is arranged to form a (i.e. substantially) elongate array) and/or the plurality of second light detectors is (i.e. substantially) elongate (e.g. the plurality of second light detectors is arranged to form a (i.e. substantially) elongate array), as a greater proportion of the rays of light emitted by the elongate light source are able to reach the first and/or second light detectors than when a non-elongate light source is used.

It may be that the at least one light source comprises (e.g. consists of) an incandescent light bulb (e.g. a micro-bulb). It may be that the at least one light source comprises (e.g. consists of) a Nernst (e.g. infrared) light source, for example a 'Nernst glower'.

It may be that the at least one light source comprises (e.g. consists of) a (e.g. infrared) hotplate (e.g. a micro-hotplate). It may be that the at least one light source comprises (e.g. consists of) a resistive heating element. The resistive heating element may be formed from metal. For example, the resistive heating element may comprise a metal filament. The resistive heating element (e.g. the metal filament) may have a periodic structure. For example, the resistance of the resistive heating element (e.g. the metal filament) may vary periodically along one or more dimensions of the said resistive heating element (e.g. along the length of the metal filament). Variation in resistance along the one or more dimensions of the resistive heating element may be achieved through a periodic (i.e. spatially periodic) variation in the material structure (i.e. (spatially) periodically varying the resistivity) of the resistive heating element. The resistive heating element (e.g. the metal filament) may comprise a periodic array of (e.g. air-filled) voids (e.g. voids extending through the metal filament substantially perpendicular to the longitudinal axis thereof). Due to the periodic structure of the resistive heating element, when an electric current flows through said resistive heating element (i.e. in use), (i.e. spatially) periodically alternating regions of high current density and low current density are formed. Regions of high current density typically reach higher temperatures than regions of low current density (or average current density). Regions at higher temperatures typically emit infrared light at a higher radiant flux density than regions at lower temperatures. The periodic structure of the resistive heating element can be used to generate more spatially uniform radiation of infrared light.

It may be that the at least one light source comprises at least one solid state (e.g. infrared) light source. It may be that the at least one light source comprises a (e.g. infrared) light emitting diode (LED). It may be that the at least one light source comprises a (e.g. infrared or near-infrared) LED pumped light source. The LED pumped light source may be electrically pumped. The LED pumped light source may be optically pumped. The (e.g. infrared or near-infrared) LED pumped light source may be a (e.g. physical-vapour deposited (PVD)) chalcogenide light source.

It may be that the collector is a reflective collector, that is to say a collector comprising one or more reflective surfaces. The one or more reflective surfaces of the reflective collector may be configured to (e.g. arranged to) collimate the light emitted by the at least one light source. The one or more reflective surfaces of the reflective collector may be configured to (e.g. arranged to) condense the light emitted by the at least one light source into a beam.

The collector may comprise an internally facing reflective surface and an externally facing reflective surface. The internally facing reflective surface typically faces towards the at least one light source and the externally facing reflective surface typically faces away from the at least one light source. The internally facing reflective surface and the externally facing reflective surface are typically spaced apart from each other. The internally facing reflective surface and the externally facing reflective surface may be arranged such that (e.g. at least some of) the light emitted by the at least one light source is reflected first by the internally facing reflective surface and second by the externally facing reflective surface, thereby (e.g. substantially) collimating the light and/or condensing the light into a beam (i.e. without refraction of the light).

The collector does not typically comprise refractive beam shaping elements (such as lenses or prisms). Refractive beam shaping elements typically introduce spectral variation into a light beam. Reflective beam shaping elements allow a beam to be redirected without introducing spectral variation. In particular, reflective beam shaping elements do not typically introduce chromatic aberrations.

It may be that either or both of the internally facing and externally facing reflective surfaces are curved. For example, it may be that either or both of the internally facing and externally facing reflective surfaces are ellipsoidal (i.e. form at least part of the surface of an ellipsoid), or spheroidal (i.e. form at least part of the surface of a spheroid), or spherical (i.e. form at least part of the surface of a sphere, e.g. are hemispherical in shape).

It may be that the internally facing and externally facing reflective surfaces are (e.g. substantially) concentric.

It may be that the internally facing reflective surface has a larger radius of curvature than the externally facing reflective surface.

It may be that the internally facing reflective surface comprises a beam-forming aperture configured such that (i.e. in use) light reflected by the externally facing reflective surface escapes through the beam-forming aperture in the internally facing reflective surface, thereby forming a beam of light.

The one or more reflective surfaces (e.g. the internally facing reflective surface and/or the externally facing reflective surface) may be formed from metal-coated plastics materials (such as injection moulded plastics).

The collector and the at least one light source may be configured to emit a substantially elongate beam of light, that is to say a beam of light which, in cross-section in a plane perpendicular to the direction of travel, is substantially elongate along one direction. For example, it may be that the at least one light source is a substantially elongate light source configured to emit a substantially elongate beam of light and that the collector is configured to maintain a substantially elongate cross-section (i.e. a substantially elongate cross-sectional shape) of the beam of light. Alternatively, it may be that the at least one light source is a rotationally symmetric light source (i.e. a non-elongate light source) and the collector is configured to spread light emitted by the light source over a line focus (for example by providing the collector with a degree of astigmatism), thereby forming a beam of light having a substantially elongate cross-section (i.e. a substantially elongate cross-sectional shape).

It may be that the optical sensor is open to the surrounding environment (i.e. such that sample gas may diffuse or flow between the at least one light source and the at least one interference filter).

It may be that the at least one light source, the at least one interference filter, the plurality of first light detectors and the plurality of second light detectors are arranged such that (i.e. in use) light emitted by the at least one light source passes through a detection volume (e.g. a fluid sample containing volume) and is incident on the at least one light filter.

The optical sensor may comprise one or more reflective surfaces (e.g. mirrors) defining a folded optical path between the at least one light source and the at least one interference filter (i.e. such that the beam of light typically intersects or crosses itself as it travels from the at least one light source to the at least one interference filter). The one or more reflective surfaces are typically arranged such that the optical path (i.e. the distance travelled by light from the at least one light source to the at least one interference filter) is substantially greater than a characteristic dimension of the optical sensor (e.g. a characteristic dimension of the sensor body, for example the length of the sensor body). The folded optical path typically permits a longer optical path to be achieved in a smaller sensor body, providing greater opportunity for absorbance by the fluid sample and a stronger signal at the detectors without an increase in device size.

Alternatively, it may be that the optical sensor is configured such that light emitted by the at least one light source, or light exiting the collector, falls directly onto the at least one interference filter (i.e. such that there are no additional reflective surfaces positioned in the path along which light travels between the at least one light source, or the collector, and the at least one interference filter). For example, it may be that the at least one interference filter is positioned directly in the path of light emitted by the at least one light source or exiting the collector.

One or more of the one or more reflective surfaces (e.g. mirrors) may be (i.e. substantially) planar. One or more of the one or more reflective surfaces (e.g. mirrors) may be curved. One or more of the one or more reflective surfaces (e.g. mirrors) may be spherical (or at least form a portion of the surface of a sphere). One or more of the one or more reflective surfaces (e.g. mirrors) may be cylindrical (or at least form a portion of the surface of a cylinder). One or more of the one or more reflective surfaces (e.g. mirrors) may be biconvex. One or more of the one or more reflective surfaces (e.g. mirrors) may be configured (e.g. arranged) to introduce astigmatism into the reflected beam of light. For example, the curvature (e.g. the radii of curvature) of the one or more reflective surfaces (e.g. mirrors) may be selected to introduce astigmatism into the reflected beam of light. Astigmatism may be used to compensate for excessive spatial variation in the intensity of light emitted from a periodic light source (such as a light source array) by blurring the beam of light. Astigmatism introduced by the one or more reflective surfaces (e.g. mirrors) therefore typically reduces the spatial variation in the intensity of light emitted from the periodic light source (e.g. the light source array).

One or more of the one or more reflective surfaces (e.g. mirrors) may be configured to direct a weakly convergent beam of light onto the at least one interference filter, for example such that a maximum angle between individual rays of light and a normal to the surface of the at least one interference filter onto which the rays are incident (e.g. a normal to a longitudinal axis of the at least one interference filter) is less than or equal to 12°, or more preferably less than or equal to 6°.

The sensor typically comprises the same number of first light detectors as second light detectors. The first light detectors and the second light detectors are typically arranged to form corresponding pairs of first and second light detectors. Each first light detector typically receives light transmitted from a corresponding filtering portion of the at least one interference filter and the corresponding second light detector typically receives light reflected by the same filtering portion of the at least one interference filter. The corresponding first and second light detectors may be configured to detect light within the same wavelength range (i.e. to detect the presence of the same one or more species in the fluid sample).

It may be that the at least one interference filter is a plurality of interference filters. It may be that the sensor comprises one interference filter for each of the plurality of first light detectors and/or each of the plurality of second light detectors (i.e. for each corresponding pair of first light detectors and second light detectors). Each of the plurality of interference filters may be configured to selectively transmit (i.e. or reflect) light in different wavelength ranges. For each corresponding pair of first and second light detectors, the first light detector typically receives light transmitted from the corresponding interference filter and the second light detector typically receives light reflected by the same interference filter.

It may be that the at least one interference filter consists of a single filter.

It may be that the at least one interference filter (for example, each of the plurality of interference filters) comprises (e.g. consists of) a variable filter, i.e. a filter whose spectral properties (i.e. the wavelength dependence of the filter's transmittance and/or reflectance) vary along a length of the filter. It may be that the variable filter is a linear variable filter, i.e. a filter whose spectral properties (i.e. the wavelength dependence of the filter's transmittance and/or reflectance) vary linearly along the length of the filter. It may be that the variable filter is a continuously variable filter, i.e. a filter whose spectral properties (i.e. the wavelength dependence of the filter's transmittance and/or reflectance) vary continuously along the length of the filter.

It may be that the at least one interference filter consists of two or more variable filters such as two or more linear variable filters and/or continuously variable filters.

It may be that the at least one interference filter (or each of the plurality of interference filters) comprises (e.g. consists of) a filter whose spectral properties (i.e. the wavelength dependence of the filter's transmittance and/or reflectance) does not vary substantially along a length of the filter, i.e. whose spectral properties are substantially uniform. For example, the at least one interference filter may be a plurality of interference filters, each said filter having substantially uniform spectral properties. The (i.e. substantially uniform) spectral properties of each filter of said plurality of interference filters may be different.

For example, it may be that each said filter (of the plurality of interference filters) is a bandpass filter. Some or all of the said filters may have different passbands. Some or all of the said filters may have overlapping passbands. Some or all of the said filters may have non-overlapping passbands. Some or all of the said filters may have different passband widths.

It may be that each said filter (of the plurality of interference filters) is a high-pass filter. Some or all of the said filters may have different cut-off frequencies. Some of all of the said filters may have the same cut-off frequencies.

It may be that each said filter (of the plurality of interference filters) is a low-pass filter. Some or all of the said filters may have different cut-off frequencies. Some of all of the said filters may have the same cut-off frequencies.

Use of a plurality of filters each having a different spectral properties can result in an enhanced signal and reduction in noise when compared with, for example, use of a single filter of variable passband width. This is because the passband of a variable filter typically grades spatially and results in smearing of the passband spectral shape over the filter, giving non-optimum coverage of the gas absorption spectrally characteristic range. Use of a plurality of filters also typically makes it easier to compensate for temperature shifts in the passband width; indeed, the discrete bandpass filter spectral characteristic can be more readily broadened to accommodate temperature induced shifts in the source or detector spectral position.

The at least one interference filter (or each of the plurality of interference filters) may be a band-pass filter. The band-pass filter may have a (i.e. relatively) narrow passband, e.g. a passband having a bandwidth which is between 1% and 4% of the spectral bandwidth of the light emitted by the at least one light source. The band-pass filter may be a variable band-pass filter (i.e. a filter having a variable passband).

The at least one interference filter (or each of the plurality of interference filters) may be a high-pass filter. The high-pass filter is typically an edge filter having a (i.e. relatively) steep lower band edge. Edge steepness can be defined by the wavelength range over which transmission of incident light varies between 10% and 90% (i.e. the percentage of incident light which is transmitted through the filter varies between 10% and 90%). The transmission of incident light may vary between 10% and 90% over a range of wavelengths spanning less than 5% of the measurement wavelength band, or less than 2.5% of the measurement wavelength band, or less than 1% of the measurement wavelength band. Transmission of incident light typically reaches a value of 50% within the said range of wavelengths spanning less than 5% of the measurement wavelength band, or less than 2.5% of the measurement wavelength band, or less than 1% of the measurement wavelength band. The high-pass filter permits all of the light to be used, while the steep lower band edge permits accurate deconvolution of the spectral content of a received signal.

The at least one interference filter (or each of the plurality of interference filters) may be a low-pass filter.

The skilled person will understand that an interference filter is a filter which selectively transmits (i.e. and/or reflects) incident light in one or more characteristic wavelength ranges (i.e. spectral bands). The transmission and/or reflection wavelength ranges are determined principally by Fabry-Pérot interference between rays of light partially reflected and partially transmitted at two or more interfaces of (e.g. within) the interference filter. An interference filter typically has a multi-layered structure comprising a plurality of interfaces at which light may be partially reflected and partially transmitted. The transmission and/or reflection wavelength ranges are typically determined by the optical properties (e.g. refractive index) of each layer forming the interference filter and the thickness of each said layer.

The at least one interference filter (or each of the plurality of interference filters) may, in addition, filter light by secondary mechanisms (i.e. other than by Fabry-Pérot) interference. For example, the at least one interference filter (or each of the plurality of interference filters) may be configured to absorb some incident light. The at least one interference filter (or each of the plurality of interference filters) may be configured to absorb incident light at one or more wavelengths, for example in one or more wavelength bands.

The at least one interference filter (or each of the plurality of interference filters) may be configured to absorb incident light having wavelengths outside a range of wavelengths of interest, i.e. outside the range of wavelengths within which species to be detected (i.e. the analyte) absorb light and/or outside the range of wavelengths to be detected by the first and/or second light detectors. Absorption of such wavelengths of light typically improves out-of-band blocking (the term 'out-of-band' referring to wavelengths of light outside the said range of interest).

The at least one interference filter (or each of the plurality of interference filters) may comprise one or more light-absorbing dyes. The at least one interference filter (or each of the plurality of interference filters) may comprise a neutral-density filter.

The at least one interference filter (or each of the plurality of interference filters) may be configured such that absorption of light is constant (i.e. uniform) across (e.g. along the length of) the at least one interference filter. For example, it may be that the fraction (e.g. the percentage) of incident light having a particular wavelength which is absorbed is constant (i.e. uniform) across (e.g. along the length of) the at least one interference filter. Alternatively, it may be that absorption of light (e.g. the fraction (e.g. the percentage) of incident light having a particular wavelength which is absorbed) varies across (e.g. along the length of) the at least one interference filter. However, when the absorption of light varies across (e.g. along the length of) the at least one interference filter, it typically varies according to a known of spatial parameters. For example, it may be that the absorption of light (e.g. the fraction (e.g. the percentage) of incident light having a particular wavelength which is absorbed) varies linearly across (e.g. along the length of) the at least one interference filter.

The plurality of first light detectors may be (i.e. substantially) identical to one another. The plurality of second light detectors may be (i.e. substantially) identical to one another. Each of the plurality of first light detectors may be (i.e. substantially) identical to each of the plurality of second light detectors.

Alternatively, each of the plurality of first light detectors may be configured to detect light within a different wavelength range. Each of the plurality of first light detectors may therefore be configured to detect the presence of one or more particular species in the fluid sample. Similarly, each of the plurality of second light detectors may be configured to detect light within a different wavelength range. Each of the plurality of second light detectors may therefore be configured to detect the presence of one or more particular species in the fluid sample.

The plurality of first light detectors may form an array of first light detectors (i.e. a first light detector array). The plurality of first light detectors may form a linear array of first light detectors (i.e. a first light detector array). The plurality of second light detectors may form an array of second light detectors (i.e. a second light detector array). The plurality of second light detectors may form a linear array of second light detectors (i.e. a second light detector array). For example, it may be that the optical sensor comprises the sensor body, the at least one light source, the at least one interference filter, the first light detector array and the second light detector array, the first light detector array comprising the plurality of first light detectors and the second light detector array comprising the plurality of second light detectors, the at least one light source, the at least one interference filter, the first light detector array and the second light detector array being arranged such that (i.e. in use) light emitted by the at least one light source passes through the chamber (i.e. thereby passing through the fluid sample) and is incident on the at least one interference filter, the first light detector array receiving light transmitted through the at least one interference filter and the second light detector array receiving light reflected by the at least one interference filter.

One or more of (e.g. each of) the plurality of first light detectors and/or one or more of (e.g. each of) the plurality of second light detectors may be thermopile detectors (e.g. micro-electromechanical (MEMS) thermopile detectors). One or more of (e.g. each of) the plurality of first light detectors and/or one or more of (e.g. each of) the plurality of second light detectors may be pyroelectric detectors (e.g. MEMS pyroelectric detectors). One or more of (e.g. each of) the plurality of first light detectors and/or one or more of (e.g. each of) the plurality of second light detectors may be lead selenide (PbSe) detectors (such as physical vapour deposited PbSe detectors).

One or more of (e.g. each of) the plurality of first light detectors and one or more of (e.g. each of) the plurality of second light detectors are typically uncooled.

It may be that the at least one light source is (i.e. substantially) elongate, the plurality of first light detectors is arranged to form a first (i.e. substantially) elongate array and the plurality of second light detectors is arranged to form a second (i.e. substantially) elongate array. It may be that the collector is configured to direct a beam of light (i.e. emitted by the at least one light source), which is (i.e. substantially) elongate in cross section, onto the at least one interference filter such that a beam of transmitted light (i.e. light which is transmitted through the at least one interference filter), which is (i.e. substantially) elongate in cross section, is incident on the first (i.e. substantially) elongate array and a beam of reflected light (i.e. light which is reflected by the at least one interference filter), which is (i.e. substantially) elongate in cross section, is incident on the second (i.e. substantially) elongate array. It may be that the beam of transmitted light (i.e. a longitudinal axis of the (i.e. substantially) elongate cross section of the beam of transmitted light) is aligned with a longitudinal axis of the first (i.e. substantially) elongate array. It may be that the beam of reflected light (i.e. a longitudinal axis of the (i.e. substantially) elongate cross section of the beam of transmitted light) is aligned with a longitudinal axis of the second (i.e. substantially) elongate array.

It may be that the at least one (i.e. substantially) elongate light source is configured such that the intensity of light emitted (i.e. by the said at least one (i.e. substantially) elongate light source) varies spatially in intensity along a longitudinal axis of said (i.e. substantially) elongate light source. For example, it may be that the intensity of light emitted by the said at least one (i.e. substantially) elongate light source comprises a plurality of (e.g. three of more) intensity maxima (and a plurality of intensity minima therebetween) along the longitudinal axis of the (i.e. substantially) elongate cross section of the beam of light. It may be that the collector is configured to blur the beam of light emitted by the at least one light source along the longitudinal axis of the said (i.e. substantially) elongate cross section. It may be that the astigmatism of the collector is configured to (for example, one or more portions of the collector are shaped to introduce the astigmatism in order to) blur the beam of light emitted by the at least one light source along the longitudinal axis of the said substantially (i.e. elongate) cross section.

The concentration of a species detected by the plurality of first light detectors and/or the plurality second light detectors can be established using the Beer-Lambert Law. For a monochromatic light source, the Beer-Lambert law may be expressed as:

$$I_1 = I_0 10^{-\alpha L c}$$

where $I_0$ is the intensity of light that is incident on the fluid sample, $I_1$ is the intensity of light after passing through the material, L is the distance that the light travels through the fluid sample from the at least one light source to the plurality for first and/or second light detectors (i.e. the path length), c is the concentration of the species in the fluid sample, and α is the absorption coefficient of the species. The Beer-Lambert law applies to monochromatic radiation and the corresponding relationship for polychromatic light can be established by summation/integration.

The optical sensor may comprise a detection circuit. The detection circuit may be configured to receive one or more signals output by the plurality of first light detectors. The detection circuit may be configured to receive one or more signals output by the plurality of second light detectors. The detection circuit may be configured to detect the presence of one or more species in the fluid sample based on the one or more signals received from the plurality of first light detectors and/or the one or more signals received from the plurality of second light detectors. The detection circuit may be configured to output a detection signal dependent on (i.e. indicative of) the presence of one or more species in the fluid sample (i.e. based on the one or more signals received from the plurality of first light detectors and/or the one or more signals received from the plurality of second light detectors).

The optical sensor may comprise a comparator circuit. The comparator circuit may be configured to compare one or more signals output by the plurality of first light detectors and one or more signals output by the plurality of second light detectors (i.e. to thereby determine the presence and/or concentration of one or more species in the fluid sample). The comparator circuit may be configured to output a comparator signal dependent on (e.g. indicative of) the presence and/or concentration of one or more species in the fluid sample.

The comparator circuit may be configured to compare one or more signals output by the plurality of first light detectors and/or one or more signal output by the plurality of second light detectors with stored calibration data (i.e. calibration data stored in a memory, for example calibrated data stored in a look-up table in a memory).

The processor (e.g. in electronic communication with a memory storing computer executable program code) may be configured to (e.g. programmed to) output a signal (e.g. a digital signal) indicative of the presence (e.g. and/or the concentration) of one or more species in the fluid sample.

The processor may comprise a microprocessor. The processor may comprise a controller (e.g. a microcontroller). The processor may comprise a field-programmable gate array (FPGA).

A second aspect of the invention provides a method of detecting one or more species in a fluid sample. The method comprises: shining light through the fluid sample onto at least one interference filter, there being a spatial variation in the intensity of light incident on the said at least one interference filter; receiving light transmitted through and/or reflected by the at least one interference filter; and detecting one or more species in the fluid sample based on the transmitted and/or reflected light received.

There is typically a spatial variation in the intensity of light incident on the at least one interference filter when there is no fluid sample present (i.e. when there is no analyte present). There is typically also a spatial variation in the intensity of light incident on the at least one interference filter when there is fluid sample present (i.e. when there is analyte present). It may be that the spatial variation in the intensity of light incident on the at least one interference filter when there is no fluid sample present is the same as (or similar to) the spatial variation in the intensity of light incident on the at least one interference filter when there is fluid sample present.

The method may comprise receiving light transmitted through the at least one interference filter and generating one or more output signals. The method may comprise receiving light reflected by the at least one interference filter and generating one or more output signals.

It may be that the method comprises a plurality of light detectors receiving light transmitted through the at least one interference filter. It may be that the method comprises a plurality of light detectors receiving light reflected by the at least one interference filter.

It may be that the method comprises a plurality of light detectors receiving light transmitted through the at least one interference filter and generating one or more output signals. Additionally or alternatively, it may be that the method comprises a plurality of light detectors receiving light reflected by the at least one interference filter and generating one or more output signals.

The method may comprise detecting one or more species in the fluid sample based on the one or more output signals (e.g. the one or more output signals generated by the plurality of light detectors).

The method may comprise processing the one or more output signals to calculate one or more outputs (for example the composition of the fluid sample, e.g. the concentration of one or more analytes in the fluid sample) while compensating for the spatial variation in the intensity of light incident on the at least one interference filter.

The method may comprise: the plurality of light detectors receiving light transmitted through the at least one interference filter; the plurality of light detectors generating one or more output signals indicative of the intensity of light received by said plurality of light detectors; and processing the one or more output signals to calculate one or more outputs while compensating for the spatial variation in the intensity of light incident on the at least one interference filter.

The method may comprise: the plurality of light detectors receiving light reflected by the at least one interference filter; the plurality of light detectors generating one or more output signals indicative of the intensity of light received by said plurality of light detectors; and processing the one or more output signals to calculate one or more outputs while compensating for the spatial variation in the intensity of light incident on the at least one interference filter.

The method may comprise the plurality of light detectors generating one or more output signals indicative of the intensity of light received by said plurality of light detectors at one or more (i.e. characteristic) wavelengths. The method may comprise the plurality of light detectors generating one or more output signals indicative of the intensity of light received by said plurality of light detectors within one or more wavelength ranges.

The method may comprise processing the one or more output signals while compensating for the spatial variation in the intensity of light incident on the at least one interference filter to thereby determine a spectral variation in the intensity of light incident on the at least one interference filter.

The method may comprise processing the one or more output signals while compensating for the spatial variation in the intensity of light incident on the at least one interference filter. The method may comprise processing the one or more output signals while compensating for the spatial variation in the intensity of light incident on the at least one interference filter to thereby determine a spectral variation in the intensity of light incident on the at least one interference filter.

The method may comprise taking into account spatial variation calibration data (the spatial variation calibration data being data describing the spatial variation in the intensity of light incident on the at least one interference filter) when processing the one or more output signals. For example, the method may comprise processing the one or more output signals, taking into account spatial variation calibration data, to compensate for the spatial variation in the intensity of light incident on the at least one interference filter and thereby determining the spectral variation in the intensity of light incident on the at least one interference filter.

The method may comprise a processor (e.g. in electronic communication with a memory storing computer executable program code) processing the one or more output signals. The spatial variation calibration data may be stored in the memory. The method may comprise a processing circuit processing the one or more output signals.

It may be that the method comprises: shining light through the fluid sample onto at least one interference filter; receiving light transmitted through the at least one interference filter; receiving light reflected by the at least one interference filter; and detecting one or more species in the fluid sample based on the transmitted and reflected light received.

The method may comprise at least one light source shining light through the fluid sample onto the at least one interference filter.

The method may comprise a plurality of first light detectors receiving light transmitted through the at least one interference filter and generating an output signal. The method may comprise a plurality of second light detectors receiving light reflected by the at least one interference filter and generating an output signal. The method may comprise detecting one or more species in the fluid sample based on the output signals from both the plurality of first light detectors and the plurality of second light detectors.

The method may comprise processing (e.g. summing) the output signals from both the plurality of first light detectors and the plurality of second light detectors to thereby determine a spatial variation in the intensity of light incident on the at least one interference filter. The method may comprise determining a spectral variation of the intensity of light transmitted through and/or reflected by the at least one interference filter taking into account the spatial variation in the intensity of light incident on the at least one interference filter.

It may be that the at least one interference filter is a plurality of interference filters. It may be that the sensor comprises one interference filter for each of the plurality of first light detectors and/or each of the plurality of second light detectors. Each of the plurality of interference filters may be configured to selectively transmit (i.e. or reflect) light in different wavelength ranges.

It may be that the at least one interference filter consists of a single filter.

It may be that the at least one interference filter (or each of the plurality of interference filters) comprises (e.g. consists of) a variable filter, i.e. a filter whose spectral properties (i.e. the wavelength dependence of the filter's transmittance and/or reflectance) vary along a length of the filter. It may be that the variable filter is a linear variable filter, i.e. a filter whose spectral properties (i.e. the wavelength dependence of the filter's transmittance and/or reflectance) vary linearly along the length of the filter. It may be that the variable filter is a continuously variable filter, i.e. a filter whose spectral properties (i.e. the wavelength dependence of the filter's transmittance and/or reflectance) vary continuously along the length of the filter.

It may be that the at least one interference filter (or each of the plurality of interference filters) consists of two or more variable filters such as two or more linear variable filters and/or continuously variable filters.

The at least one interference filter (or each of the plurality of interference filters) may be a band-pass filter. The band-pass filter may have a (i.e. relatively) narrow passband, e.g. a passband having a bandwidth which is between 1% and 4% of the spectral bandwidth of the light emitted by the at least one light source. The band-pass filter may be a variable band-pass filter (i.e. a filter having a variable passband).

The at least one interference filter (or each of the plurality of interference filters) may be a high-pass filter. The high-pass filter is typically an edge filter having a (i.e. relatively) steep lower band edge. The high-pass filter permits all of the light to be used, while the steep lower band edge permits accurate deconvolution of the spectral content of a received signal.

The at least one interference filter (or each of the plurality of interference filters) may be a low-pass filter.

It may be that the method comprises shining infrared light (i.e. having wavelengths in the range 700 nm to 1,000,000 nm) through the fluid sample. It may be that the at least one light source is an infrared light source. It may be that the at least one interference filter is at least one infrared interference filter. It may be that the plurality of first light detectors is a plurality of first infrared light detectors. It may be that the plurality of second light detectors is a plurality of second infrared light detectors.

It may be that the infrared light has wavelengths in the range 2000 nm to 12000 nm, or in the range 2000 nm to 5000 nm.

It may be that the at least one light source is at least one near-infrared (NIR) light source, that is to say a light source configured to emit light having wavelengths in the range 700 nm to 2500 nm. Additionally or alternatively, it may be that the at least one light source is at least one mid-infrared (mid-IR) light source, that is to say a light source configured to emit light having wavelengths in the range 2500 nm to 10000 nm.

The method typically comprises shining broadband light through the fluid sample and onto the at least one interference filter. The at least one light source is typically a broadband light source, that is to say the at least one light source is typically configured to emit light (e.g. substantially uniformly) over a range of frequencies (i.e. the at least one light source is not a monochromatic light source).

It may be that the method comprises collimating the light into a beam. It may be that the method comprises directing the beam of light onto the at least one interference filter.

It may be that the method comprises shining a beam of light (e.g. infrared light) through the fluid sample onto the at least one interference filter.

It may be that the at least one light source is configured to emit a divergent beam of light. It may be that the beam of light formed by collecting and/or condensing light emitted by the at least one light source is a substantially parallel beam of light. It may be that the beam of light formed by collecting and/or condensing light emitted by the at least one light source is a slightly divergent beam of light, i.e. in which individual light rays diverge by up to 6°.

It may be that the method comprises directing a substantially elongate beam of light onto the at least one interference filter, that is to say a beam of light which, in cross-section in a plane perpendicular to the direction of travel, is substantially elongate along one direction.

There may be the same number of first light detectors as second light detectors. The first light detectors and the second light detectors are typically arranged to form corresponding pairs of first and second light detectors. Each first light detector typically receives light transmitted from a corresponding filtering portion of the at least one interference filter and the corresponding second light detector typically receives light reflected by the same filtering portion of the at least one interference filter. The corresponding first and second light detectors may be configured to detect light within the same wavelength range (i.e. to detect the presence of the same one or more species in the fluid sample).

It may be that the at least one interference filter is a plurality of interference filters. It may be that the sensor comprises one interference filter for each of the plurality of first light detectors and/or each of the plurality of second light detectors (i.e. for each corresponding pair of first light detectors and second light detectors). Each of the plurality of interference filters may be configured to selectively transmit (i.e. or reflect) light in different wavelength ranges. For each corresponding pair of first and second light detectors, the first light detector typically receives light transmitted from the corresponding interference filter and the second light detector typically receives light reflected by the same interference filter.

The plurality of first light detectors may be (i.e. substantially) identical to one another. The plurality of second light detectors may be (i.e. substantially) identical to one another.

Each of the plurality of first light detectors may be (i.e. substantially) identical to each of the plurality of second light detectors.

Alternatively, each of the plurality of first light detectors may be configured to detect light within a different wavelength range. Each of the plurality of first light detectors may therefore be configured to detect the presence of one or more particular species in the fluid sample. Similarly, each of the plurality of second light detectors may be configured to detect light within a different wavelength range. Each of the plurality of second light detectors may therefore be configured to detect the presence of one or more particular species in the fluid sample.

The plurality of first light detectors may form an array of first light detectors (i.e. a first light detector array). The plurality of first light detectors may form a linear array of first light detectors (i.e. a first light detector linear array). The plurality of second light detectors may form an array of second light detectors (i.e. a second light detector array). The plurality of second light detectors may form a linear array of second light detectors (i.e. a second light detector linear array). For example, it may be that the optical sensor comprises the sensor body, the at least one light source, the at least one interference filter, the first light detector array and the second light detector array, the first light detector array comprising the plurality of first light detectors and the second light detector array comprising the plurality of second light detectors, the at least one light source, the at least one interference filter, the first light detector array and the second light detector array being arranged such that (i.e. in use) light emitted by the at least one light source passes through the chamber (i.e. thereby passing through the fluid sample) and is incident on the at least one interference filter, the first light detector array receiving light transmitted through the at least one interference filter and the second light detector array receiving light reflected by the at least one interference filter.

One or more of (e.g. each of) the plurality of first light detectors and/or one or more of (e.g. each of) the plurality of second light detectors may be thermopile detectors (e.g. micro-electromechanical (MEMS) thermopile detectors). One or more of (e.g. each of) the plurality of first light detectors and/or one or more of (e.g. each of) the plurality of second light detectors may be pyroelectric detectors (e.g. MEMS pyroelectric detectors). One or more of (e.g. each of) the plurality of first light detectors and/or one or more of (e.g. each of) the plurality of second light detectors may be lead selenide (PbSe) detectors (such as physical vapour deposited PbSe detectors).

One or more of (e.g. each of) the plurality of first light detectors and one or more of (e.g. each of) the plurality of second light detectors are typically uncooled.

It may be that the at least one light source comprises (e.g. consists of) an incandescent light bulb (e.g. a micro-bulb). It may be that the at least one light source comprises (e.g. consists of) a Nernst (e.g. infrared) light source, for example a 'Nernst glower'.

It may be that the at least one light source comprises (e.g. consists of) a (e.g. infrared) hotplate (e.g. a micro-hotplate). It may be that the at least one light source comprises (e.g. consists of) a resistive heating element. The resistive heating element may be formed from metal. For example, the resistive heating element may comprise a metal filament. The resistive heating element (e.g. the metal filament) may have a periodic structure. For example, the resistance of the resistive heating element (e.g. the metal filament) may vary periodically along one or more dimensions of the said resistive heating element (e.g. along the length of the metal filament). Variation in resistance along the one or more dimensions of the resistive heating element may be achieved through a periodic (i.e. spatially periodic) variation in the material structure (i.e. (spatially) periodically varying the resistivity) of the resistive heating element. The resistive heating element (e.g. the metal filament) may comprise a periodic array of (e.g. air-filled) voids (e.g. voids extending through the metal filament substantially perpendicular to the longitudinal axis thereof). Due to the periodic structure of the resistive heating element, when an electric current flows through said resistive heating element (i.e. in use), (i.e. spatially) periodically alternating regions of high current density and low current density are formed. Regions of high current density typically reach higher temperatures than regions of low current density. Regions at higher temperatures typically emit infrared light at a higher radiant flux density than regions at lower temperatures. The periodic structure of the resistive heating element can be used to generate more spatially uniform radiation of infrared light.

It may be that the at least one light source comprises at least one solid state (e.g. infrared) light source. It may be that the at least one light source comprises a (e.g. infrared) light emitting diode (LED). It may be that the at least one light source comprises a (e.g. infrared or near-infrared) LED pumped light source. The LED pumped light source may be electrically pumped. The LED pumped light source may be optically pumped. The (e.g. infrared or near-infrared) LED pumped light source may be a (e.g. physical-vapour deposited (PVD)) chalcogenide light source.

infrared) hotplate (e.g. a micro-hotplate). It may be that the at least one light source comprises (e.g. consists of) a resistive heating element. The resistive heating element may be formed from metal. For example, the resistive heating element may comprise a metal filament. The resistive heating element (e.g. the metal filament) may have a periodic structure. For example, the resistance of the resistive heating element (e.g. the metal filament) may vary periodically along one or more dimensions of the said resistive heating element (e.g. along the length of the metal filament). Variation in resistance along the one or more dimensions of the resistive heating element may be achieved through a periodic variation in the material structure (i.e. periodically varying the resistivity) of the resistive heating element. The resistive heating element (e.g. the metal filament) may comprise a periodic array of (e.g. air-filled) voids (e.g. voids extending through the metal filament substantially perpendicular to the longitudinal axis thereof). The periodic structure of the resistive heating element typically results in a more spatially uniform radiation of infrared light.

It may be that the at least one light source comprises a (e.g. infrared) light emitting diode (LED). It may be that the at least one light source comprises a (e.g. infrared or near-infrared) LED pumped light source. The (e.g. infrared or near-infrared) LED pumped light source may be a (e.g. physical-vapour deposited (PVD)) chalcogenide light source.

The method may comprise receiving one or more signals output by the plurality of first light detectors. The method may comprise receiving one or more signals output by the plurality of second light detectors. The method may comprise detecting the presence of one or more species in the fluid sample based on the one or more signals received from the plurality of first light detectors and/or the one or more signals received from the plurality of second light detectors. The method may comprise outputting a detection signal dependent on (i.e. indicative of) the presence of one or more species in the fluid sample (i.e. based on the one or more signals received from the plurality of first light detectors and/or the one or more signals received from the plurality of second light detectors).

It may be that the method comprises comparing one or more signals output by the plurality of first light detectors and one or more signals output by the plurality of second light detectors (i.e. to thereby determine the presence and/or concentration of one or more species in the fluid sample). The method may comprise comparing one or more signals output by the plurality of first light detectors and one or more signals output by the plurality of second light detectors to thereby separate a spatial variation in the intensity of light incident on the at least one interference filter from a spectral variation of light intensity transmitted through or reflected by the at least one interference filter.

The method may comprise outputting a signal (e.g. a digital signal) indicative of the presence of one or more species in the fluid sample. The method may comprise outputting a signal (e.g. a digital signal) indicative of the concentration of one or more species in the fluid sample.

A third aspect of the invention provides a method of calibrating an optical sensor according to the first aspect of the invention. The method comprises: the at least one light source shining light onto the at least one interference filter; the plurality of light detectors receiving light transmitted through and/or reflected by the at least one interference filter and generating one or more output signals; and determining calibration data based on the one or more output signals.

The method may comprise the at least one light source shining light onto the at least one interference filter when there is no fluid sample present. The method may comprise measuring the one or more output signals generated by the plurality of light detectors when there is no fluid sample present. The calibration data may be derived from at least one measurement of the one or more output signals generated by the plurality of light detectors when there is no fluid sample present.

The method may comprise the at least one light source shining light onto the at least one interference filter when there is no analyte present (i.e. when there is no analyte present in the fluid sample, that is to say when the analyte concentration is zero). The method may comprise measuring the one or more output signals generated by the plurality of light detectors when there is no analyte present. The calibration data may be derived from at least one measurement of the one or more output signals generated by the plurality of light detectors when there is no analyte present.

The method may comprise measuring one or more output signals generated by the plurality of light detectors at at least one temperature (e.g. at a least one device temperature, light source temperature, interference filter temperature and/or detector temperature). The calibration data may be derived from at least one measurement of the one or more output signals generated by the plurality of light detectors at the at least one temperature.

The method may comprise measuring one or more output signals generated by the plurality of light detectors at a first temperature (e.g. at a first device temperature, first light source temperature, first interference filter temperature and/ or first detector temperature) and measuring one or more output signals generated by the plurality of light detectors at a second (i.e. different) temperature (e.g. at a second device temperature, second light source temperature, second interference filter temperature and/or second detector temperature). The calibration data may be derived from at least one measurement of the one or more output signals generated at the first temperature and at least one measurement of the one or more output signals generated at the second temperature.

The method may comprise measuring one or more output signals generated by the plurality of light detectors at at least one fluid sample composition (e.g. at least one concentration of analyte in the fluid sample). The calibration data may be derived from at least one measurement of the one or more output signals generated by the plurality of light detectors at the at least one fluid sample composition.

The method may comprise measuring one or more output signals generated by the plurality of light detectors at a first fluid sample composition (e.g. a first concentration of analyte in the fluid sample) and measuring one or more output signals generated by the plurality of light detectors at a second (i.e. different) fluid sample composition (e.g. a second concentration of analyte in the fluid sample). The calibration data may be derived from at least one measurement of the one or more output signals generated by the plurality of light detectors at the first fluid sample composition and at least one measurement of the one or more output signals generated by the plurality of light detectors at the second fluid sample composition.

The calibration data may be spatial variation calibration data, that is to say data describing the spatial variation in the intensity of light incident on the at least one interference filter. The spatial variation calibration data may record the variation in the intensity of light incident on the at least one interference filter measured along one or more dimensions of the said at least one interference filter. For example, the spatial variation calibration data may record the variation in the intensity of light incident on the at least one interference filter along the length of the at least one interference filter.

The spatial variation calibration data may record the variation in the intensity of light received by the plurality of light detectors. The plurality of light detectors may be arranged to form a linear array of detectors and the spatial variation calibration data may record the variation in the intensity of light received by the plurality of detectors along the length of the linear array.

The method may comprise storing the calibration data (e.g. electronically) in a memory. The method may comprise storing the calibration data in a look-up table (i.e. in the memory).

A fourth aspect of the invention provides an optical sensor (i.e. the optical sensor according to the first aspect of the invention) calibrated according to the method of the third aspect of the invention.

A fifth aspect of the invention provides an optical sensor comprising at least one light source, a reflective collector and at least one light detector, wherein the reflective collector comprises an internally facing reflective surface and an externally facing reflective surface, the internally and externally facing reflective surfaces being spaced apart from each other and being configured to (e.g. substantially) collimate light emitted by the at least one light source (e.g. thereby forming a beam of light).

The collector comprising an internally facing reflective surface and an externally facing reflective surface is typically a particularly compact arrangement. The use of a reflective collector is typically compatible with a broadband light source (compared to, for example, use of refractive optics).

The internally facing reflective surface typically faces towards the at least one light source and the externally facing reflective surface typically faces away from the at least one light source. The internally facing reflective surface and the externally facing reflective surface may be arranged such that (e.g. at least some of) the light emitted by the at least one light source is reflected first by the internally facing reflective surface and second by the externally facing reflective surface, thereby (e.g. substantially) collimating the light and/or condensing the light into a beam.

It may be that either or both of the internally facing and externally facing reflective surfaces are curved. For example, it may be that either or both of the internally facing and externally facing reflective surfaces are ellipsoidal (i.e. form at least part of the surface of an ellipsoid), or spheroidal (i.e. form at least part of the surface of a spheroid), or spherical (i.e. form at least part of the surface of a sphere, e.g. are hemispherical in shape).

It may be that the internally facing and externally facing reflective surfaces are (e.g. substantially) concentric.

It may be that the internally facing reflective surface has a larger radius of curvature than the externally facing reflective surface.

It may be that the internally facing reflective surface comprises a beam-forming aperture configured such that (i.e. in use) light reflected by the externally facing reflective surface escapes through the beam-forming aperture in the internally facing reflective surface, thereby forming a beam of light.

The one or more reflective surfaces (e.g. the internally facing reflective surface and/or the externally facing reflective surface) may be formed from metal-coated plastics materials (such as injection moulded plastics).

The reflective collector does not typically comprise refractive beam shaping elements. Refractive beam shaping elements typically introduce wavelength variation into reflected light beams. The reflective collector typically comprises reflective beam shaping elements (i.e. the one or more reflective surfaces) which do not introduce wavelength variation on reflection of light beams. In particular, reflective beam shaping elements do not typically introduce chromatic aberrations.

The invention extends in sixth aspect to an optical sensor for multispectral analysis of a fluid sample, the optical sensor comprising at least one light source, at least one interference filter, a plurality of first light detectors and a plurality of second light detectors, the at least one light source, the at least one interference filter, the plurality of first light detectors and the plurality of second light detectors being arranged such that (i.e. in use) light emitted by the at least one light source is incident on the at least one interference filter, wherein the plurality of first light detectors receive light transmitted through the at least one interference filter and the plurality of second light detectors receive light reflected by the at least one interference filter The invention extends in a seventh aspect to a method of detecting one or more species in a fluid sample. The method comprises: shining light through the fluid sample onto at least one interference filter; receiving light transmitted through the at least one interference filter; receiving light reflected by the at least one filter; and detecting one or more species in the fluid sample based on the transmitted and reflected light received.

Optional and preferred features of any one aspect of the invention may be features of any other aspect of the invention.

DESCRIPTION OF THE DRAWINGS

An example embodiment of the present invention will now be illustrated with reference to the following Figures in which.

DETAILED DESCRIPTION OF AN EXAMPLE EMBODIMENT

Figure 1:
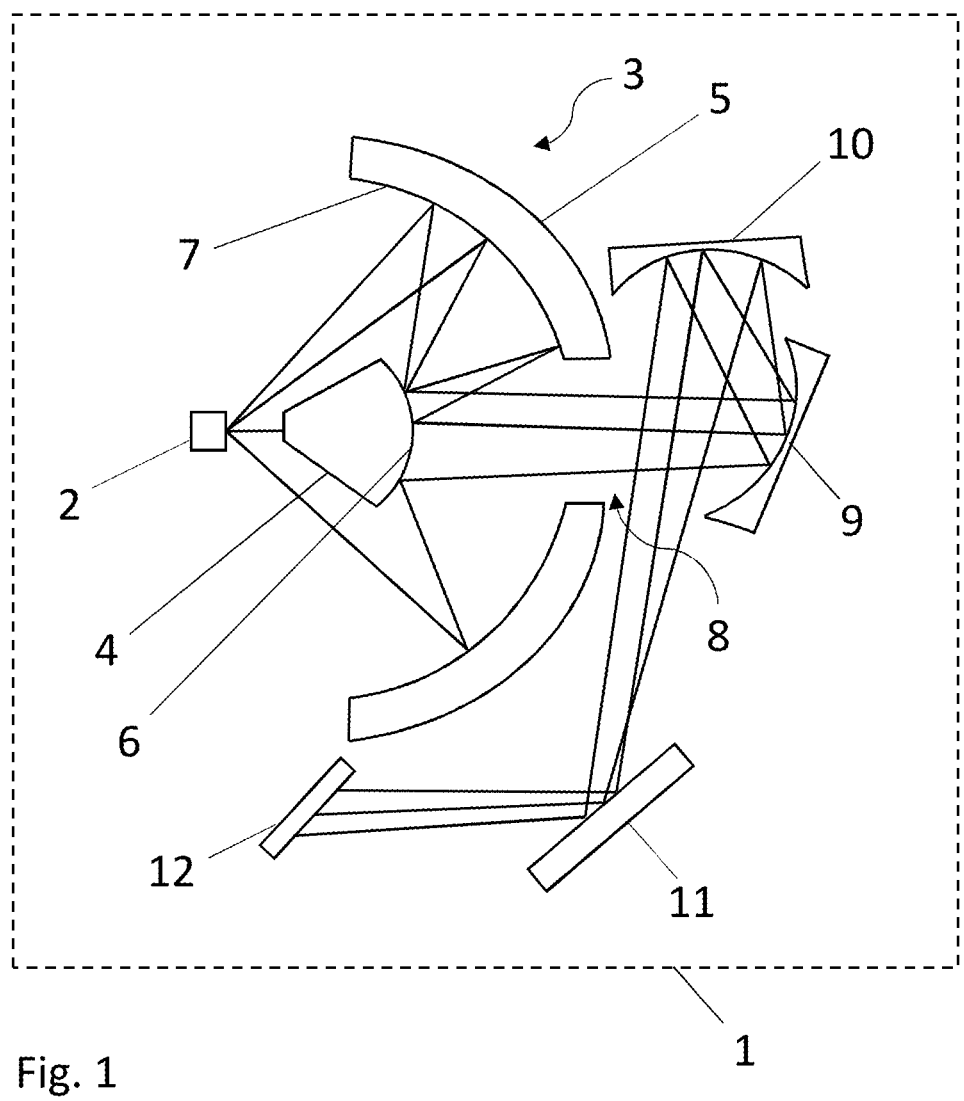
FIG. 1 shows the optical configuration of a multispectral gas sensor.

FIG. 1 shows the optical configuration of a multispectral sensor 1. Although the sensor may be used to detect analytes in a sample of any light-permeable fluid such as a gas or a liquid, this example embodiment focuses on the detection of analytes in a gas sample.

The sensor has a broadband infrared light source consisting of a MEMS hotplate 2. The hotplate 2 is configured to emit infrared light having wavelengths in the range 2000 nm to 14000 nm. The hotplate comprises a linear array of light-emitting hotspots which are formed by current density focusing due to a periodic spatial variation in the resistance of the hotplate. The output from the MEMS hotplate 2 can be modulated (for example pulse-wave modulated).

A reflective collector 3 consists of a first reflector 4 and a second reflector 5. Both first and second reflectors 4 and 5 are formed from injection moulded plastics materials coated with gold. The first reflector 4 has a substantially hemispherical, convex gold reflecting surface 6. The second reflector 5 has a substantially hemispherical, concave gold reflecting surface 7. The radius of curvature of the reflecting surface 7 is approximately twice the radius of curvature of the reflecting surface 6. The first and second reflectors 4 and 5 are arranged in the format of a Schwarzschild objective in which the reflecting surfaces 6 and 7 are concentric. An aperture 8 extends through the second reflector 5 and through the second reflecting surface 7.

As shown in FIG. 1, in use, the light source 2 emits light over wide range of angles. The collector 3 condenses some of the light emitted from the light source 2 to form a substantially collimated beam of light. In particular, some of the light emitted from the light source is reflected once by the reflecting surface 7, and then subsequently by the reflecting surface 6, before escaping from the collector 3 through the aperture 8.

Curved mirrors 9 and 10 and planar mirror 11 are arranged to direct the beam of light escaping from the collector 3 towards a linear variable filter (LVF) 12. One skilled in the art will be aware that LVFs can be manufactured from materials such as silicon dioxide ($SiO_2$) or titanium dioxide ($TiO_2$). The thickness of the LVF typically varies linearly along its length such that the Fabry-Pérot interference between opposing surfaces also varies along its length. Accordingly, the spectral properties of the LVF vary continuously along the length of the filter. In this example embodiment the LVF is a high-pass filter having a steep band edge, but linear variable low-pass filters and bandpass filters (e.g. formed from a high-pass filter and a low-pass filter provided on opposing sides of a single substrate) are also possible.

Because the hotplate 2 comprises a linear array of hotspots, the beam escaping from the collector is substantially elongate in cross-section parallel to the axis of the linear array. The mirrors 9, 10 and 11 are arranged such that the elongate linear beam is projected onto the LVF parallel to its longitudinal axis. The curvature of the mirrors 9 and 10 is configured to introduce a primary astigmatism such that the light beam is blurred parallel to the axis of the linear array of hotspots. This reduces spatial variation in the intensity of the beam of light projected onto the LVF, along the length of the LVF, due to the discontinuous nature of the light source.

Figure 2:
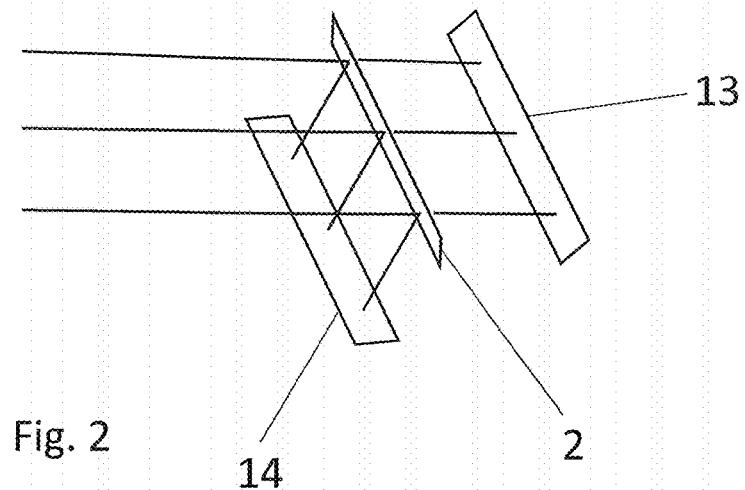
FIG. 2 shows the configuration of a linear variable filter and two detector arrays within the gas sensor of FIG. 1.

A portion of the light incident on the LVF is transmitted through the LVF and a portion of the light is reflected by the LVF. The range of wavelengths of light which are transmitted and reflected vary continuously along the length of the LVF. As shown in more detail in FIG. 2, first and second light detector arrays 13 and 14 are located close to the LVF. Each detector array 13 and 14 consists of a linear array of eight individual MEMS thermopile detectors. The first detector array 13 is positioned to receive light which is transmitted through the LVF. The second detector array 14 is positioned to receive light which is reflected by the LVF. Each of the first and second detector arrays 13 and 14 are connected to a processor in electronic communication with a memory and a power source (not shown). The wavelengths of light transmitted through and/or reflected by the LVF which reach each individual thermopile detector are determined by the location of the said detector along the length of the LVF. Where the LVF is a high-pass filter (or a low-pass filter), the intensity of transmitted and/or reflected light within a particular wavelength range can be determined by taking the difference between the signals output by adjacent detectors within each array. Where the LVF is a band-pass filter, the intensity of transmitted and/or reflected light within a particular wavelength range can be determined by measuring the signals output by individual detectors within each array.

In use, sample gas diffuses throughout the sensor, including the collector and folded light path. Light emitted by the light source 2 passes through the gas as it travels through the collector, is reflected by the mirrors 9, 10 and 11 and as it approaches the LVF 12. Some of the light at particular wavelengths is absorbed by the gas sample, dependent on the species present.

One skilled in the art will appreciate that each species has a characteristic absorption spectrum and therefore, in principle, the concentration of each species in the gas sample can be determined by measuring the level of light absorption at characteristic wavelengths. For example, water molecules absorb infrared light having wavelengths of approximately 6.3 µm, carbon dioxide at approximately 4.2 µm, 9.4 µm, 10.4 µm and 15 µm, and nitrous oxide at approximately 4.5 µm, 7.9 µm and 17 µm. The concentration of the species in the gas sample may be determined from the level of light absorption measured by applying the Beer-Lambert law.

If the gas sample contains only one species then it may be possible to determine the concentration of the species by measuring the absorption of light at only one such characteristic wavelength. However, if the gas sample contains multiple species, the concentration of each species may be determined as a function of the absorption at multiple wavelengths in the species' spectra. Some species may have overlapping absorption spectra requiring measurements to be made across a greater range of wavelengths such that signals due to the different species may be distinguished.

In order to measure light absorption, the intensity of light measured in a particular wavelength band is compared with the intensity of light which would be measured if there were no analyte present in the gas sample. Accordingly, the invention takes into account the spectral content of the light emitted by the light source, the spectral sensitivities of the individual detectors, and also the intensity of light which is received by each detector when there is no absorption of light by the gas sample which is affected by any spatial variation in the intensity of light reaching the filter.

The beam of light incident on the LVF is spectrally consistent in the sense that the incident spectrum is the same across the length of the LVF. However, there is typically a spatial variation in the overall intensity of the light incident on the LVF along its length. The absolute intensity of light incident at each point along the length of the LVF depends on the spectral content of the light source, the absorbance of light by the gas sample, reflection of the light beam by the collector and the mirrors, the spatial variation in light intensity due to the linear array of light-emitting hotspots forming the light source and the level of blurring introduced by the astigmatism in the mirrors. The intensity of light incident on each detector forming the first and second detector arrays depends on the intensity of light incident on the LVF as well as the spectral detectivity of the LVF (which varies with position along the length of the LVF). If the spectral and spatial variations due to the light source remain constant, then these contributions to the variation in light intensity can, in theory, be removed by calibrating the sensor with a known combination of gas concentrations. However, providing such a gas sample for calibration is often not practical and, more fundamentally, the spectral and spatial variations due to the source are not necessarily constant but can vary with time and temperature.

Spatial variations in the detected light intensity are corrected for as follows. At each point along the length of the LVF, incident light may be transmitted through or reflected by the filter, or absorbed or scattered. The total incident light intensity I (at each point along the length of the LVF and at each wavelength) can therefore be expressed as the sum of the contributions due to transmittance T, reflectance R, absorbance A and scattering S:

$$T+R+A+S=I$$

For high-quality, thin-film LVFs, the contributions of scattering and absorbance are negligible such that the transmitted and reflected light signals should add up to the total incident light intensity:

$$T+R=I$$

By measuring both reflected and transmitted light at the first and second detector arrays, and combining both signals, the total incident light signal (which includes the full spatial variation in the light signal) can be reconstructed. Individually, the reflected and transmitted light signals also carry spectral information due to absorption of light by the gas sample. The reconstructed incident signal can therefore be used to correct either the reflected signal or the transmitted signal to separate out the spatial and spectral components, in particular by dividing the reflected or transmitted signal by the reconstructed incident signal.

In some embodiments an LVF may absorb light at one or more wavelengths. In this situation, the amount of light absorbed, the amount of light transmitted and the amount of light reflected should add up to the total light intensity:

$$T+R+A=1$$

If incident light is only absorbed at wavelengths outside the range of measurement wavelengths (i.e. the light which is absorbed by the LVF can be described as 'out-of-band'), then the total incident 'in-band' light signal (which includes the spatial variation in the 'in-band' light signal) can be reconstructed by measuring both reflected and transmitted light at the first and second detector arrays, and combining both signals. Individually, the reflected and transmitted light signals carry 'in-band' spectral information due to absorption of light by the gas sample. The reconstructed incident 'in-band' signal can therefore be used to correct either the reflected signal or the transmitted signal to separate out the spatial and spectral components, in particular by dividing the reflected or transmitted signal by the reconstructed incident signal.

If incident light is also absorbed by the LVF at 'in-band' wavelengths (i.e. wavelengths in the range of wavelengths within which species to be detected show characteristic absorption of light), then the level of absorption by the LVF must be quantified as a function of both wavelength and location across the LVF. Calibration data describing the spectral and spatial variation in the absorption of light by the LVF can in practice be determined empirically and stored in a look-up table. The processor can be programmed to calculate the spectral component of the transmitted or the reflected signal while compensating for the spatial component using the calibration data stored in the look-up table.

Absorption of light by the LVF may be due to the inclusion of a layer of light-absorbing dye, or use of a light-absorbing substrate, whose absorption is substantially constant (i.e. uniform) across the LVF, such that, in fact, determination of spectral calibration data only is required. The total incident light signal (which includes the spatial variation in the light signal) can be reconstructed by measuring both reflected and transmitted light at the first and second detector arrays, and combining both reflected and transmitted signals with the levels of LVF absorption expected according to the look-up table. The reconstructed incident signal can again be used to correct either the reflected signal or the transmitted signal to separate out the spatial and spectral components, in particular by dividing the reflected or transmitted signal by the reconstructed incident signal.

The detector signals can also be corrected for spectral variations in the light source and/or the detectors. In order to correct the detector signals, it is necessary to determine the approximate spectral output of the light source and the responsivity of the detectors under the particular operating conditions, which can be either measured directly or modelled. The spectral output of the light source and the responsivity of the detectors depend on three main parameters: the temperature of the light source, the temperature of the detectors and a constant related to the optical throughput. These three parameters can be determined by measuring the intensity of light at one or more reference wavelengths at which absorption by the gas sample is not expected and comparing the measured light intensity at those reference wavelengths with reference values stored in a look-up table, for example. Reference values may be obtained by recording reflected and/or transmitted light intensities at a plurality of different sample concentrations and temperatures. In some embodiments, the temperature of the light source and/or the detectors is calculated directly from these reference measurements and the spectrum of the light is determined from these calculated values. In other embodiments, the spectrum of the light is determined using the look-up table by interpolation (for example, using cubic splines) between stored values of parameters describing the spectrum for given values of the (transmitted, reference or combined) light intensity at the reference wavelength bands.

In addition, the signal from the modulated light source can be demodulated at the detectors in order to separate out the measurement signals from background noise.

The measured spatial variation and spectral composition are processed to thereby determine the intensity of light which would be expected to be detected in a given wavelength band and/or at a given detector, when there is no absorption by species in the gas sample. In order to determine the concentration of each analyte gas which is present, the intensity of transmitted light received in each of a plurality of wavelength bands and/or at each of a plurality of detectors is compared with the intensity of light which would be received were no analyte gas present, taking into account both the spectral composition and the spatial variation in intensity of the incident light. This allows the proportion of light which has been absorbed to be determined for each of the plurality of wavelength bands. Simultaneous equations are then solved, using the Beer Lambert Law and the absorption coefficient of each gas in each wavelength band to determine the concentration of each analyte gas.

Figure 3:
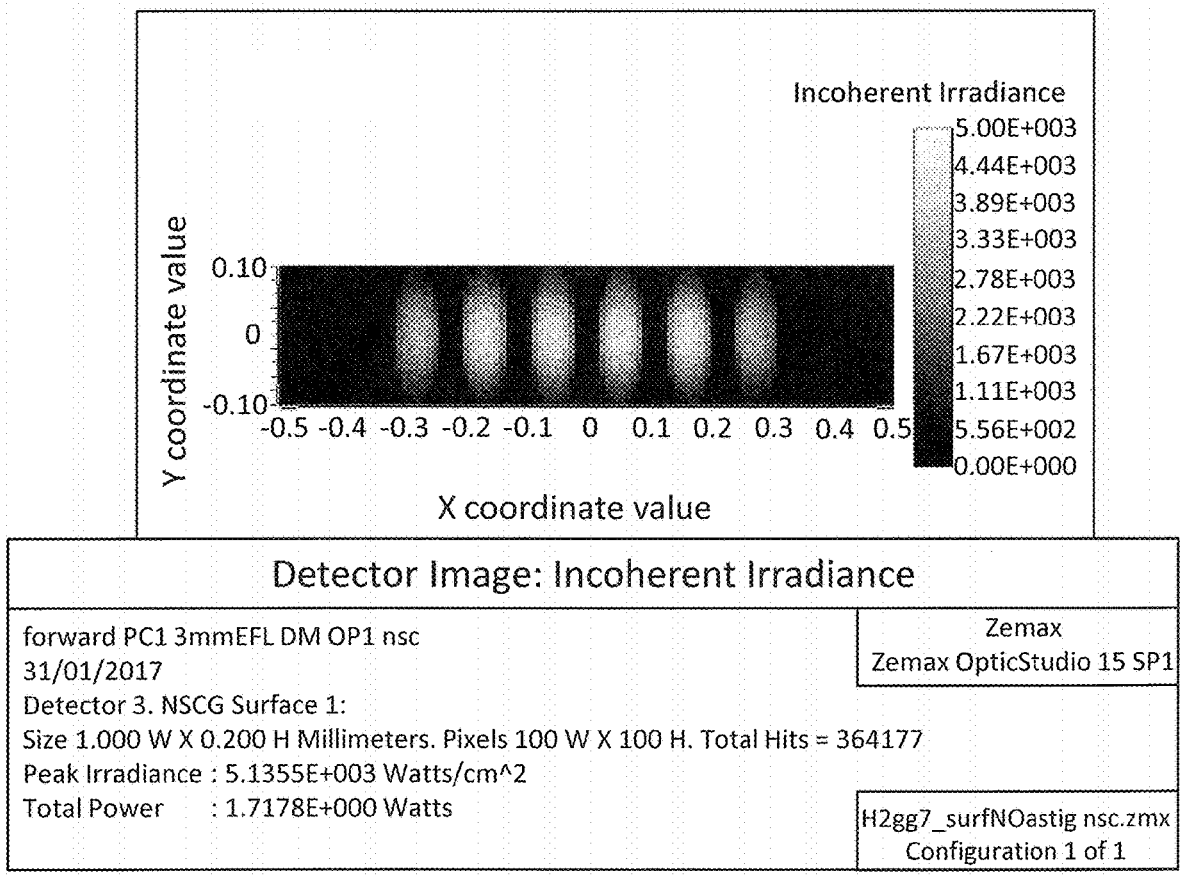
FIG. 3 shows the two-dimensional variation in light intensity output by a 0.6 mm by 0.2 mm linear array of six light sources forming a hotplate light source.
Figure 4:
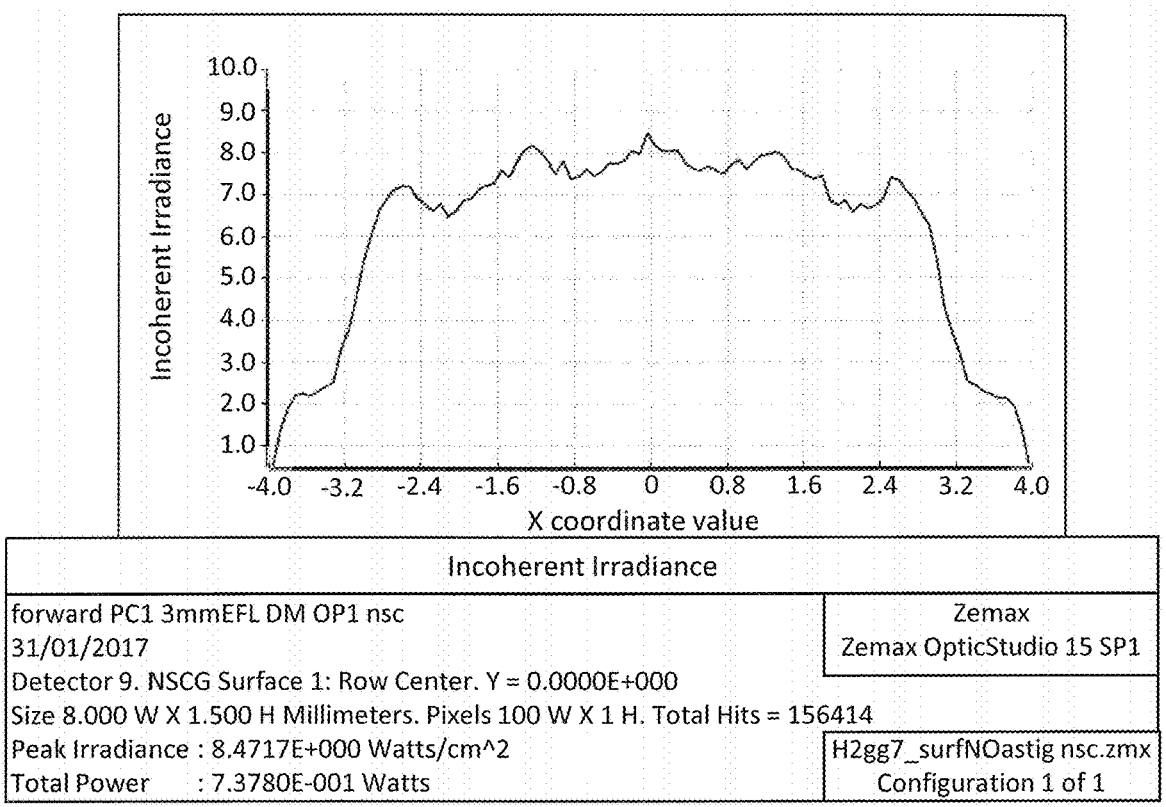
FIG. 4 shows the spatial variation in light intensity detected by a linear array of light detectors from the light source of FIG. 3 using the apparatus of FIG. 1.
Figure 5:
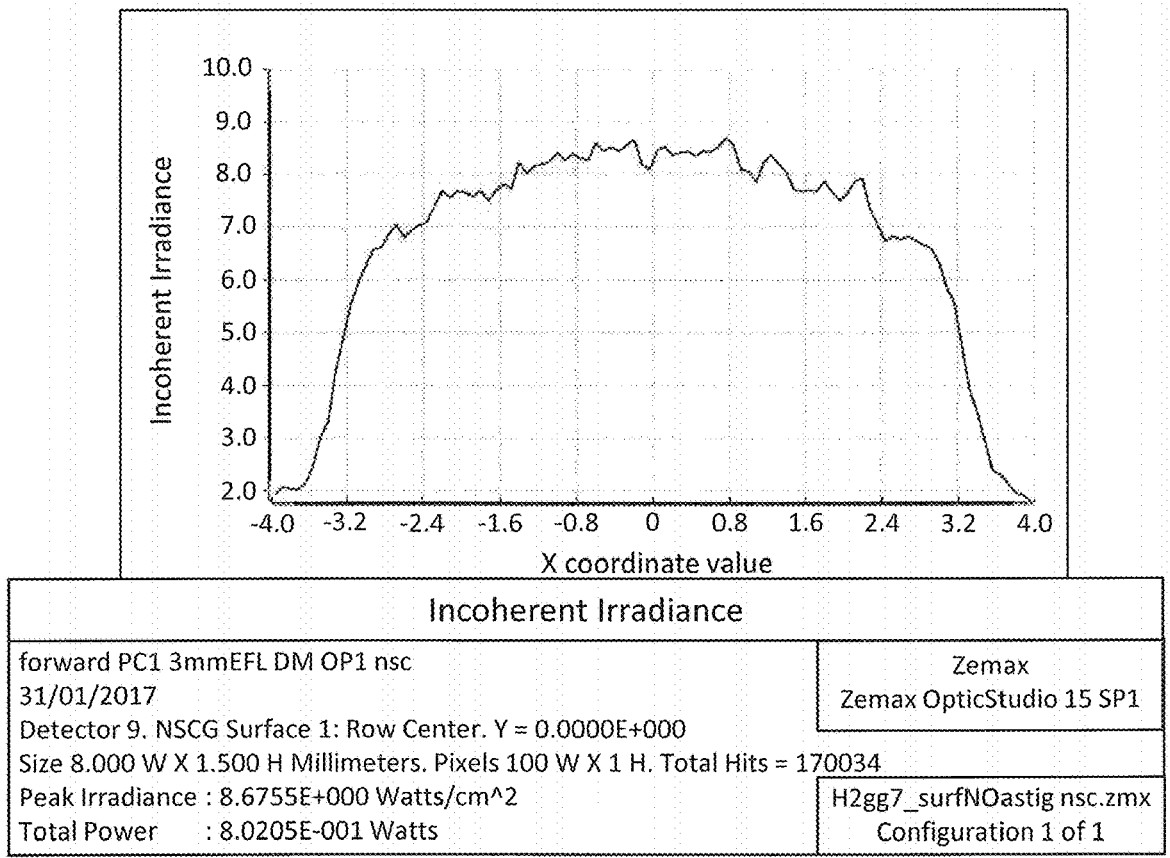
FIG. 5 shows the spatial variation in light intensity detected by a linear array of light detectors from the light source of FIG. 3 using the apparatus of FIG. 1 when emitted light is reflected by a biconcave mirror which introduces primary astigmatism into the reflected light beam.

By way of an example, FIG. 3 shows the variation in light irradiance measured by an elongate light detector positioned in front of a linear array of six hotspots (the linear array having the dimensions 0.6 mm by 0.2 mm). When such a linear hotplate light source is used in the optical system shown in FIG. 1, with mirrors 9 and 10 being spherical, the irradiation pattern at either of the first or second linear detector arrays shows a periodic structure as can be seen in FIG. 4. If, however, the emitted light beam is blurred by introducing primary astigmatism into the reflective optics (for example, by replacing either of the spherical mirrors 9 and 10 with a biconcave mirror), the periodic structure in the detected signal can be reduced, as can be seen in FIG. 5. The detected signal still shows a spatial variation, but the periodicity caused by the arrangement of discrete light sources in the linear hotplate is removed. Primary astigmatism could also be introduced by replacing spherical mirrors 9 and 10 with two cylindrical mirrors oriented at 90° to each other.

Figure 6:
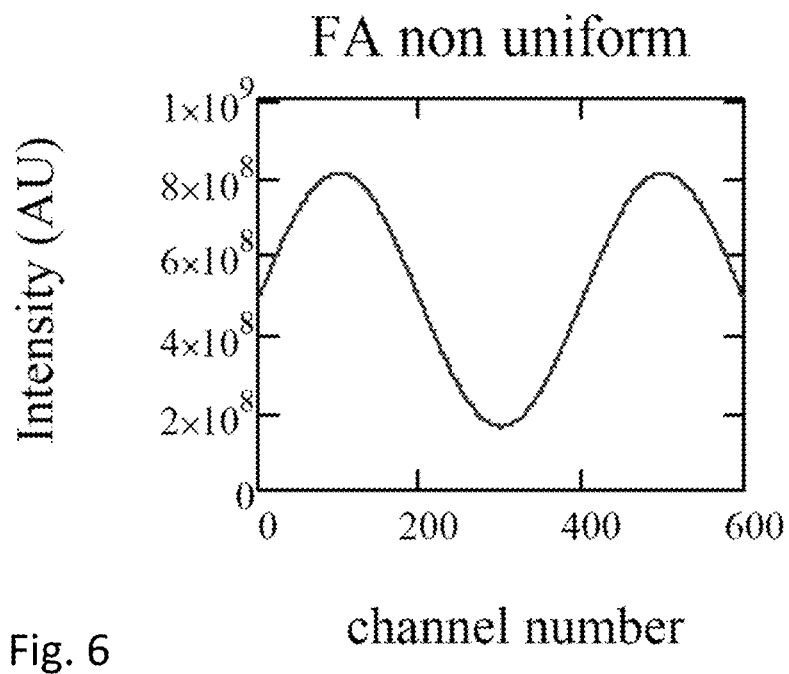
FIG. 6 shows the spatial variation in light intensity emitted from a linear array of light sources.
Figure 7:
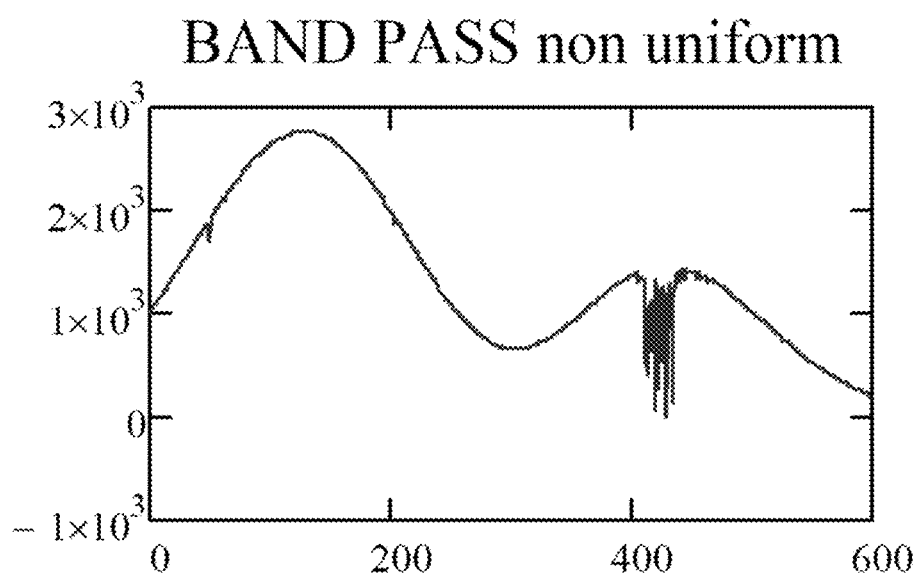
FIG. 7 shows the transmittance spectrum detected by a 2 µm uncooled lead selenide detector array when light emitted by the source of FIG. 6 is passed through a sample of carbon dioxide gas exhibiting absorption of infrared light at a wavelength of 4.2 µm.
Figure 8:
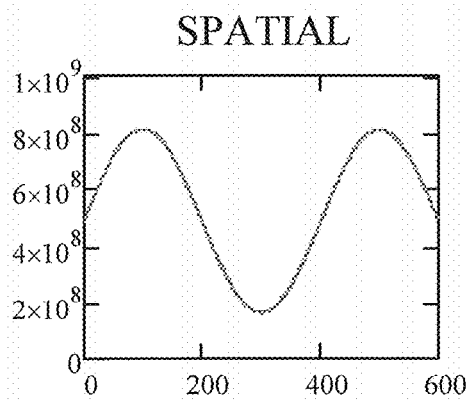
FIG. 8 shows the spatial variation in light intensity reconstructed by adding together transmitted and reflected signals from a linear variable filter.
Figure 9:
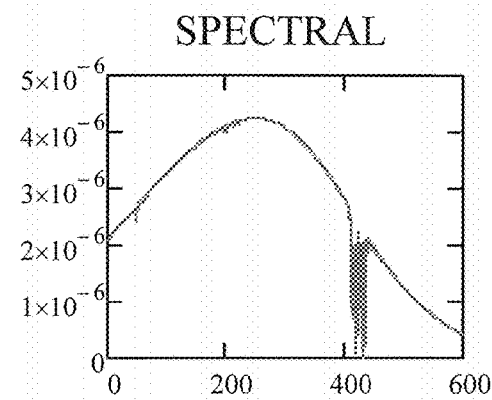
FIG. 9 shows the transmittance spectrum of FIG. 7 corrected for spectral variation as determined in FIG. 5.

FIG. 6 shows the spatial variation in the intensity of light emitted by a different example inhomogeneous linear light source. FIG. 7 shows the transmittance spectrum detected by a 2 µm uncooled lead selenide detector array if the light emitted by the linear source is passed through a sample of carbon dioxide gas (which exhibits absorption of infrared light at a wavelength of approximately 4.2 µm). The transmittance spectrum shows both spectral variation due to absorption of light by the carbon dioxide and spatial variation due to the structure of the light source. The magnitude of the spatial variation can be seen to be of the same order of magnitude as the spectral variation. FIG. 8 shows the spatial variation in light intensity which can be calculated by combining both the transmitted spectrum and a reflected spectrum. The spatial variation shown in FIG. 8 can be subtracted from the transmittance spectrum shown in FIG. 7 in order to produce the purely spectral variation shown in FIG. 9. FIG. 9 therefore shows the true absorption spectrum of the gas sample.

Accordingly, it can be seen that the spectrum obtained from the first and second detector arrays can be corrected for spatial variation in the incident light intensity. It is therefore possible to extract an accurate value of the absorption at a characteristic wavelength and to therefore determine the analyte species concentration in the gas sample accurately.

Figure 10:
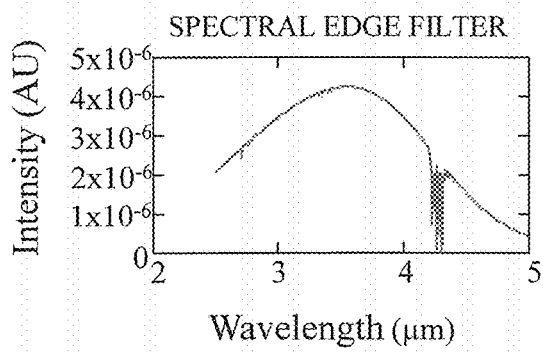
FIG. 10 shows the simulated transmittance spectrum of FIG. 9 when using a high-pass linear variable filter having a steep band edge.
Figure 11:
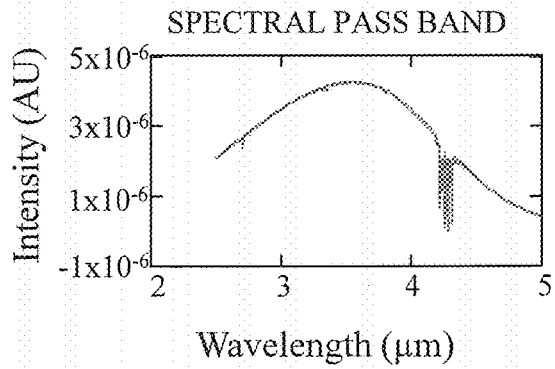
FIG. 11 shows the simulated transmittance spectrum of FIG. 9 when using a bandpass linear variable filter having a narrow pass-band.

By way of a further example, FIGS. 10 and 11 compare the simulated spectrum produced when either a high-pass LVF filter having a steep step (FIG. 10) or an LVF having a narrow pass-band (FIG. 11) are used. The spectra are almost identical. The steep step of the high-pass filter ensures that spectral content can be deconvolved from the detection signal. A benefit of a high-pass filter is that all of the incident light can be used, whereas typically only 1% of incident light is used with a bandpass filter having a narrow passband.

Figure 12:
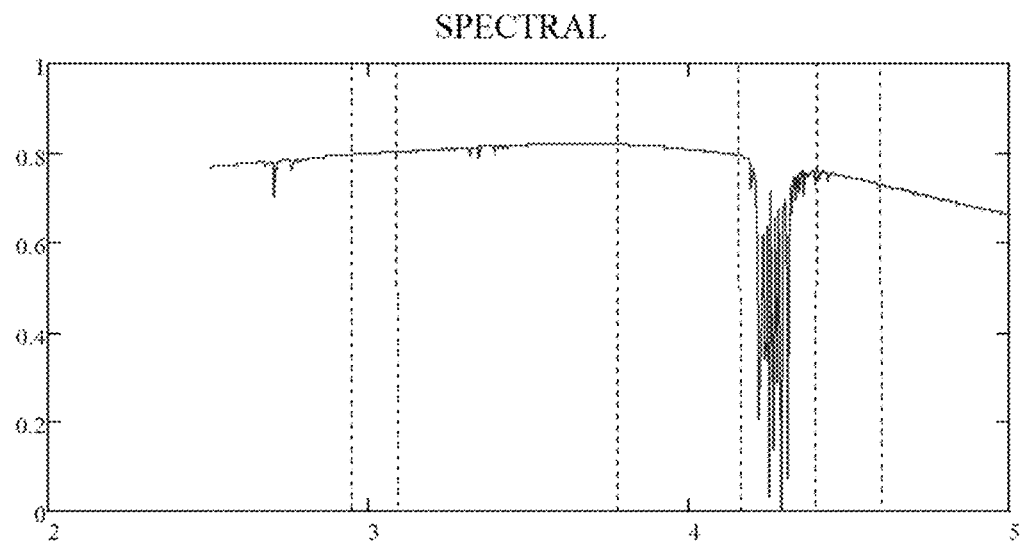
FIG. 12 indicates regions of the transmittance spectrum of FIG. 7 not dependent on gas absorption which may be used as reference channels to correct for temperature-induced spectral variation in the properties of the light source and detector array.
Figure 13:
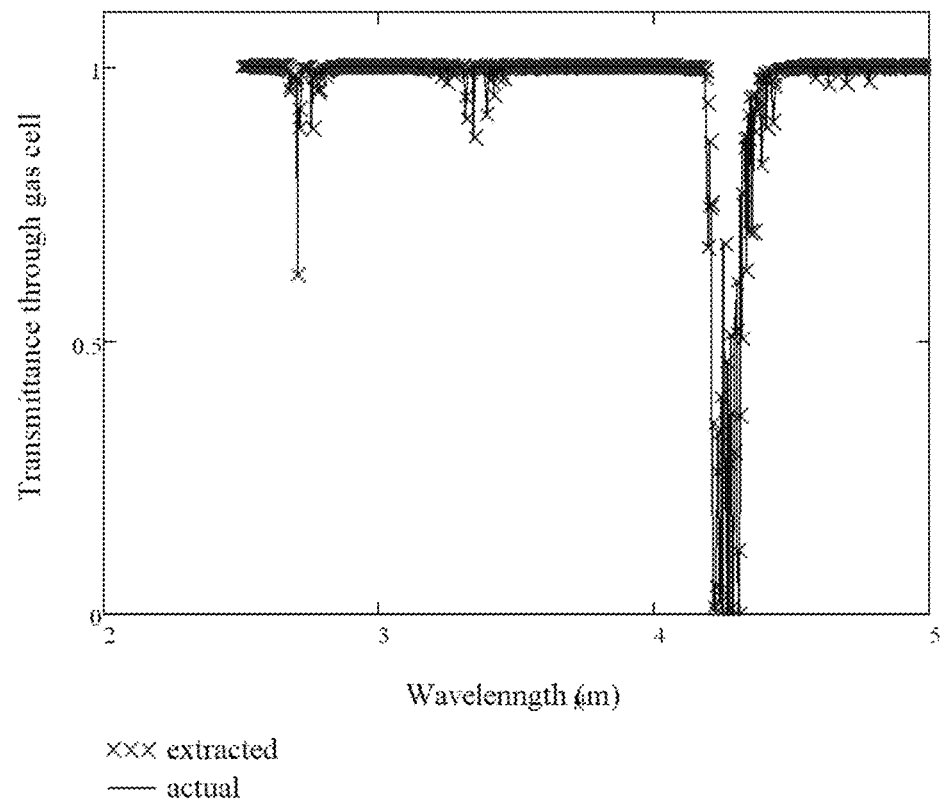
FIG. 13 shows a portion of the transmittance spectrum of FIG. 9 corrected for temperature-induced spectral variation in the properties of the light source and detector array using the reference channels of FIG. 12.
Figure 14:
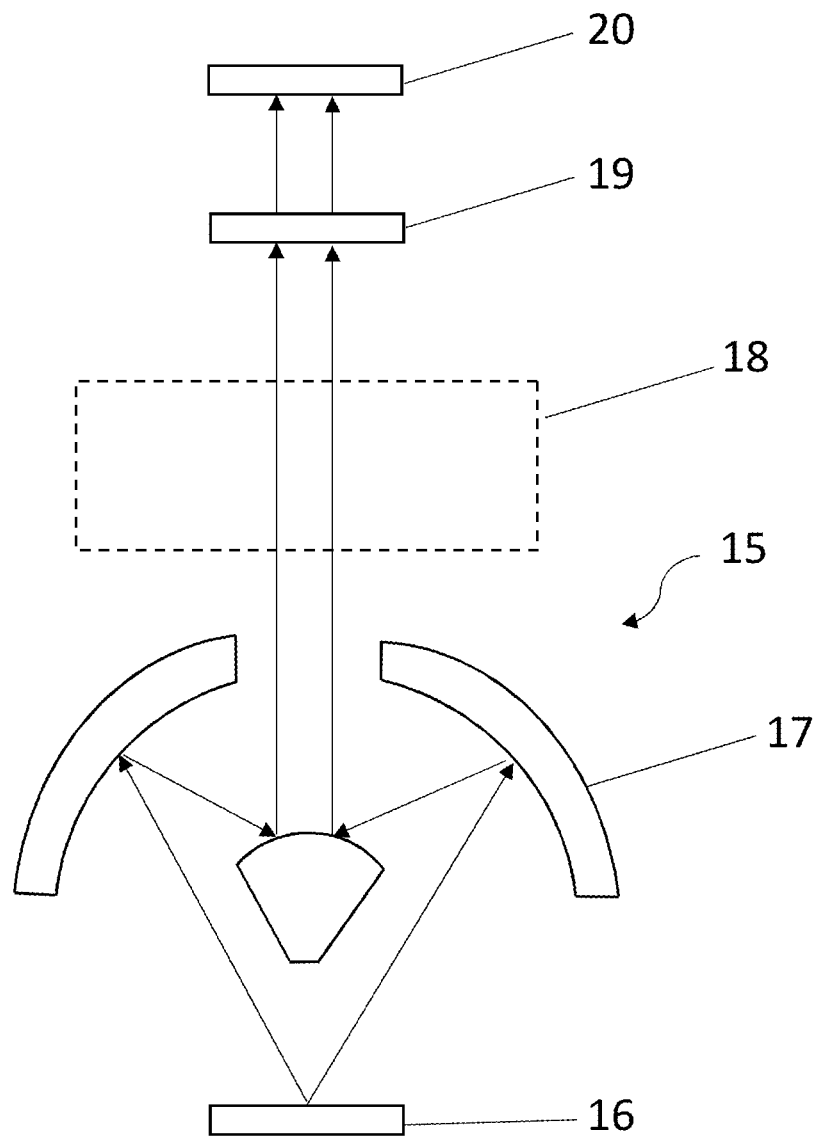
FIG. 14 shows an alternative configuration of a miniaturised infrared spectrometer suitable for analysis of breath for medical use.

By way of a further example, FIG. 12 shows three regions of the spectrum which are not subject to gas absorption (as demarcated by dashed lines) which may be used as reference channels to correct for temperature-dependent spectral variation in the light source and/or detectors. FIG. 13 compares an extracted example multi-gas transmittance spectrum, which has been corrected for spectral variation due to temperature and spatial intensity variation using these reference channels, with the known actual spectrum. The method allows the spectrum to be reproduced accurately despite both errors in the source and detector temperatures and the spatially non-uniform light source.

In a further example, the sensor is provided with a single detector array arranged to receive light which is either reflected by or transmitted through the LVF (i.e. only the reflected signal or the transmitted signal is detected, but not both). In this case, calibration data (including specifically spatial variation calibration data) is stored in a memory accessible by the processor. The calibration data is obtained in an initial calibration step by measuring the signals output by each of the detectors when light is shone onto the LVF with no analyte present and writing the calibration data to the memory. The processor is programmed to calculate one or more outputs (such as the analyte concentration) based on measurements made by the single detector array when light is shone onto the LVF with analyte present by taking into account the stored calibration data.

Figure 15:
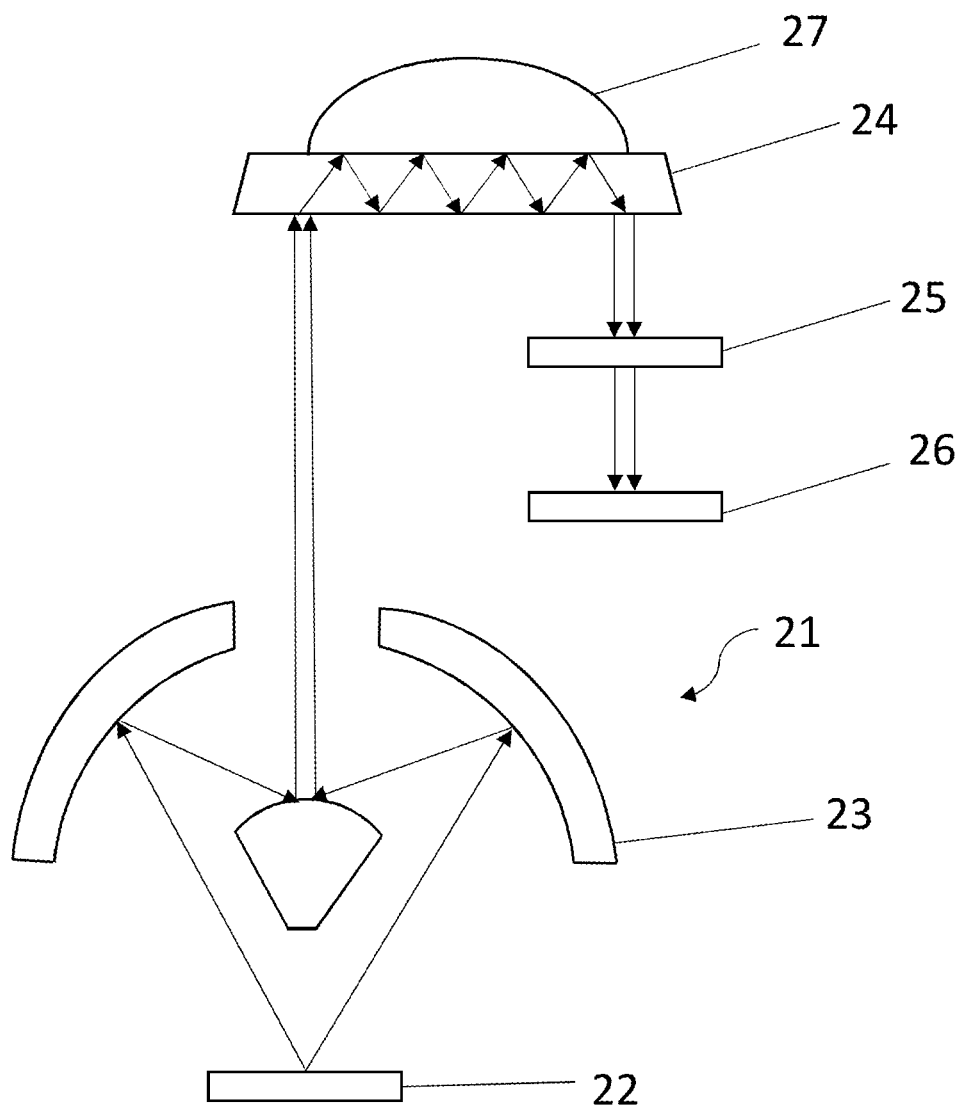
FIG. 15 shows an alternative configuration of a miniaturised infrared spectrometer suitable for analysis of liquids for medical use.
Figure 16:
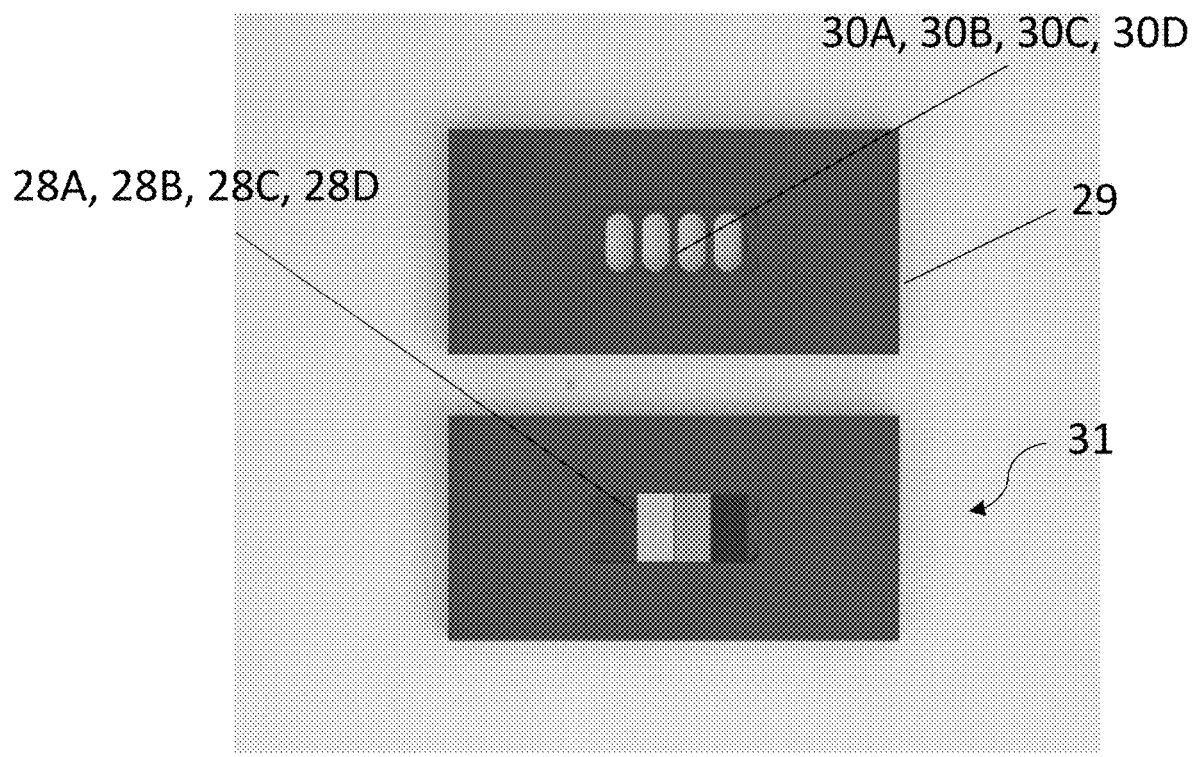
FIG. 16 shows (from a rear view) how a filter array for the miniaturised infrared spectrometer of FIG. 14 or FIG. 15 can be formed from a filter frame and a plurality of filters.

FIGS. 15 and 16 show two applications of a multispectral gas sensor in a miniaturised infrared spectrometer (MIS) for medical use: FIG. 15 shows the sensor forming part of a medical breath analyser; FIG. 16 shows the sensor forming part of a liquid analyser.

In the medical breath analyser 15 of FIG. 15, light emitted by an optical light source 16 is collected by a two-part injection moulded optic 17 and passed through a breath tube 18 which a patient can blow into. A linear variable filter 19 is provided on an opposing side of the breath tube from the optic. A detector array 20 is aligned with the linear variable filter. In use, light collected by the optic passes through a breath sample in the breath tube, subsequently passes through the linear variable filter and then is incident on the detector array. A processor processes the output from the detector array, in combination with calibration data (including spatial variation calibration data), in order to determine a corrected absorption spectrum and consequently the concentration of various analyte gases in the breath sample.

In the liquid analyser 21 of FIG. 16, a liquid sample 27 is placed on an upper surface of an attenuated total reflectance (ATR) plate 24 as is known in the art. Light emitted by an optical light source 22 is collected by a two-part injection moulded optic 23 and directed towards a lower surface of the ATR plate 24. Due to the geometry and refractive index of the plate, and the angle at which light is incident, light travels through the plate in a zig-zag path undergoing total internal reflection at the lower and upper surfaces of the plate until the light exits the plate and passes through a linear variable filter 25 before being incident on a detector array 26. Some of the light passing through the ATR plate is absorbed by the liquid sample by virtue of an evanescent wave which extends through the boundary of the plate into the sample. Accordingly, a processor is able to process the output from the detector and, in combination with calibration data, extract a corrected absorption spectrum for the liquid sample and consequently the concentration of various analytes in the liquid sample.

Figure 17:
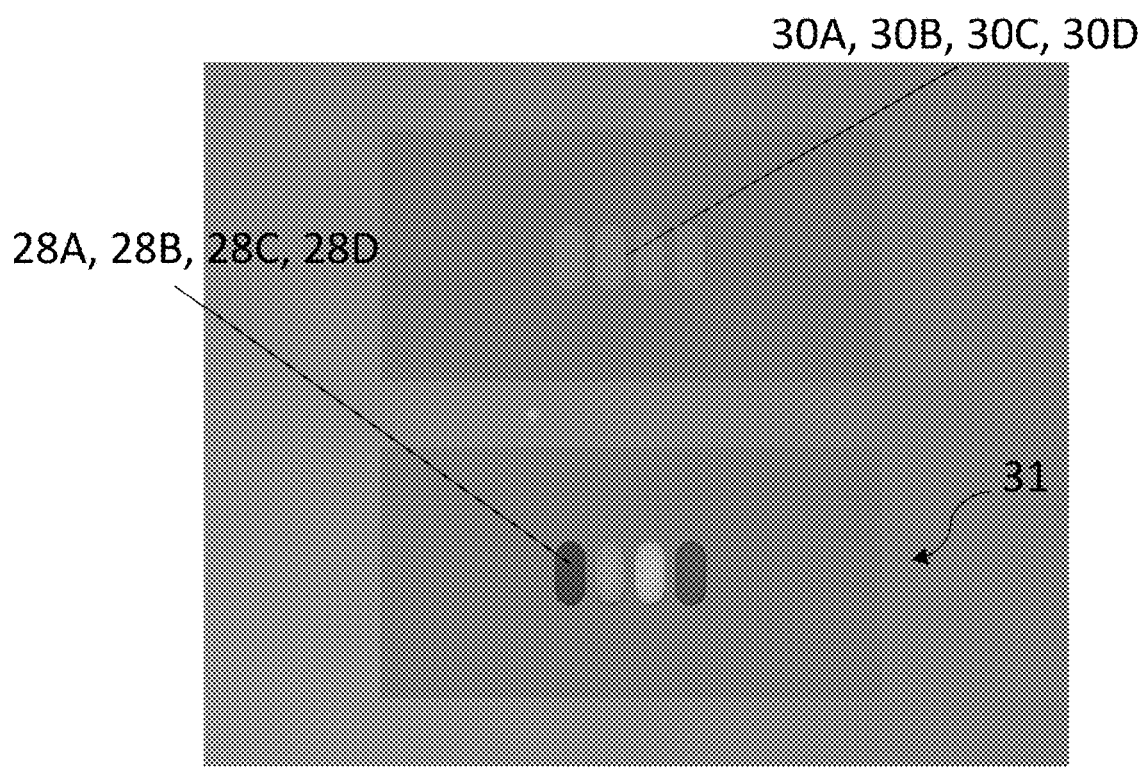
FIG. 17 shows the filter frame and filter array of FIG. 16 from a front view.

In each embodiment, the linear variable filter could be replaced by an array of filters, each said filter reflecting and transmitting light over a particular wavelength band (i.e. an array of non-variable filters). For example, FIGS. 16 and 17 show how four different filters 28A, 28B, 128C and 28D, each transmitting light over a different wavelength band, could be mounted on a filter plate 29 having four apertures 30A, 30B, 30C and 30D to form an array of filters 31. The number of filters and the passbands of the filters can be tailored to the specific analysis required.

Further variations and modifications may be made within the scope of the invention herein disclosed.

The invention claimed is:
1. An optical sensor for multispectral analysis of a fluid sample, the sensor comprising:
   at least one light source;
   at least one interference filter; and
   a plurality of light detectors arranged such that light emitted by the at least one light source passes through the fluid sample, and then the light passed through the fluid sample is incident on the at least one interference filter,
wherein there is a spatial variation in the intensity of light passed through the fluid sample incident on the at least one interference filter;
the plurality of light detectors are configured to output one or more signals on detection of light transmitted through and/or reflected by the at least one interference filter; and
the sensor is configured to determine a spectral variation in the intensity of the light incident on the at least one interference filter based on the one or more signals output by the plurality of light detectors.

2. The optical sensor according to claim 1, wherein the sensor is configured to process the one or more signals to calculate one or more outputs while compensating for the spatial variation in the intensity of light incident on the at least one interference filter, the optical sensor comprising a processor in electronic communication with a memory storing spatial variation calibration data, the processor being configured to process the one or more signals while compensating for the spatial variation in the intensity of light using the stored spatial variation calibration data to thereby determine a spectral variation in the intensity of light incident on the at least one interference filter.

3. The optical sensor according to claim 1, further comprising:
a plurality of first light detectors; and
a plurality of second light detectors,
the plurality of first light detectors receiving light transmitted through the at least one interference filter, and
the plurality of second light detectors receiving light reflected by the at least one interference filter.

4. The optical sensor according to claim 3, wherein at least one filter is a variable filter and at least one light source is a broadband source, wherein the sensor comprises the same number of first light detectors as second light detectors, wherein the first light detectors and the second light detectors are arranged to form corresponding pairs of first and second light detectors, such that each first light detector receives light transmitted from a corresponding filtering portion of the at least one interference filter and the corresponding second light detector receives light reflected by the same filtering portion of the at least one interference filter.

5. The optical sensor according to claim 3, further comprising a collector configured to collimate light emitted by the at least one light source, wherein the collector is a reflective collector comprising one or more reflective surfaces, and wherein the at least one light source is elongate, the plurality of light detectors is arranged to form an elongate array, and the collector is configured to direct a beam of light, which is substantially elongate in cross section, emitted by the at least one light source onto the at least one interference filter.

6. The optical sensor according to claim 3, further comprising a collector configured to collimate light emitted by the at least one light source, wherein the at least one light source is elongate, the plurality of first light detectors is arranged to form a first elongate array, the plurality of second light detectors is arranged to form a second elongate array, and the collector is configured to direct a beam of light, which is substantially elongate in cross section, emitted by the at least one light source onto the at least one interference filter such that a beam of transmitted light, which is substantially elongate in cross section, is incident on the first elongate array and a beam of reflected light, which is substantially elongate in cross section, is incident on the second elongate array, the beam of transmitted light being aligned with a longitudinal axis of the first elongate array and the beam of reflected light being aligned with a longitudinal axis of the second elongate array.

7. The optical sensor according to claim 6, wherein the at least one elongate light source is configured such that the intensity of light emitted varies spatially in intensity along a longitudinal axis of the elongate light source, and wherein the collector is configured to blur the beam of light emitted by the at least one light source along a longitudinal axis of the substantially elongate cross section.

8. An optical sensor according to claim 1, further comprising a reflective collector, wherein the reflective collector comprises an internally facing reflective surface and an externally facing reflective surface, the internally and externally facing reflective surfaces being spaced apart from each other and being configured to collimate light emitted by the at least one light source.

9. The optical sensor according to claim 8, wherein the internally facing reflective surface and the externally facing reflective surface are arranged such that light emitted by the at least one light source is reflected first by the internally facing reflective surface and second by the externally facing reflective surface.

10. The optical sensor according to claim 8, wherein either or both of the internally facing and externally facing reflective surfaces are curved, wherein either or both of the internally facing and externally facing reflective surfaces are substantially ellipsoidal, spheroidal or spherical, and wherein the internally facing and externally facing reflective surfaces are concentric.

11. The optical sensor according to claim 1, wherein the wherein the sensor is configured to process the one or more signals to calculate one or more outputs while compensating for the spectral variations in the light signal caused by spectral variation at the at least one light source and/or the detectors.

12. The optical sensor according to claim 11, wherein the optical sensor comprises a processor in electronic communication with a memory storing temperature calibration data, and the processor is configured to process the one or more signals while compensating for the spectral variation in the light signal by comparing the light intensity measured at one or more reference wavelengths to the temperature calibration data.

13. A method of detecting one or more species in a fluid sample, the method comprising:
shining light through the fluid sample onto at least one interference filter, wherein there is a spatial variation in the intensity of the light through the fluid sample incident on the at least one interference filter;
receiving light transmitted through the and/or reflected by the at least one interference filter;
detecting one or more species in the fluid sample based on the transmitted and/or reflected light received;
with a plurality of light detectors, receiving light transmitted through and/or reflected by the at least one interference filter and generating one or more output signals;
detecting one or more species in the fluid sample based on the one or more output signals; and
processing the one or more output signals to determine a spectral variation in the intensity of the light incident on the at least one interference filter.

14. The method according to claim 13, further comprising processing the one or more output signals to calculate one or more outputs while compensating for the spatial variation in the intensity of light incident on the at least one interference filter.

15. The method according claim 13, further comprising:
a plurality of first light detectors receiving the light transmitted through the at least one interference filter and generating an output signal;
a plurality of second light detectors receiving the light reflected by the at least one interference filter and generating an output signal;
detecting one or more species in the fluid sample based on the output signals from both the plurality of first light detectors and the plurality of second light detectors;
comparing the output signals from both the plurality of first light detectors and the plurality of second light detectors to thereby determine a spatial variation in the intensity of light incident on the at least one interference filter, wherein the at least one interference filter is a variable filter.

16. The method according to claim 13, further comprising collimating light into a beam and directing the beam onto the at least one interference filter.

17. The method according to claim 13, further comprising processing the one or more output signals to calculate one or more outputs while compensating for the spectral variations in the light signal caused by spectral variation at the at least one light source and/or the detectors.

18. The method according to claim 17, further comprising a processor in electronic communication with a memory storing temperature calibration data and processing the one or more signals to calculate one or more outputs while compensating for the spectral variation in the light signal by comparing the light intensity measured at one or more reference wavelengths to the temperature calibration data.

19. An optical sensor for multispectral analysis of a fluid sample, the sensor comprising:
at least one light source;
at least one interference filter; and
a plurality of light detectors arranged such that light emitted by the at least one light source passes through the fluid sample, and then the light passed through the fluid sample is incident on the at least one interference filter,
wherein there is a spatial variation in the intensity of light passed through the fluid sample incident on the at least one interference filter;
the plurality of light detectors are configured to output one or more signals on detection of light transmitted through and/or reflected by the at least one interference filter; and
the sensor is configured to process the one or more signals to calculate one or more outputs while compensating for the spectral variations in the light signal caused by spectral variation at the at least one light source and/or the detectors, to thereby determine a spectral variation in the intensity of the light incident on the at least one interference filter.

20. The optical sensor according to claim 19, wherein the sensor comprises a processor in electronic communication with a memory storing temperature calibration data, and the processor is configured to process the one or more signals while compensating for the spectral variation in the light signal by comparing the light intensity measured at one or more reference wavelengths to the temperature calibration data, to thereby determine a spectral variation in the intensity of the light incident on the at least one interference filter.

* * * * *

UNITED STATES PATENT AND TRADEMARK OFFICE
CERTIFICATE OF CORRECTION

PATENT NO. : 11,747,201 B2
APPLICATION NO. : 17/375897
DATED : September 5, 2023
INVENTOR(S) : Ewan Waddell et al.

It is certified that error appears in the above-identified patent and that said Letters Patent is hereby corrected as shown below:

In the Claims

Column 32, Line 33, Claim 11, please delete "wherein the"

Signed and Sealed this
Seventeenth Day of October, 2023

*Katherine Kelly Vidal*

Katherine Kelly Vidal
*Director of the United States Patent and Trademark Office*